(12) United States Patent
Yuasa

(10) Patent No.: US 6,900,886 B2
(45) Date of Patent: May 31, 2005

(54) PHOTOMETRIC APPARATUS

(75) Inventor: Yoshio Yuasa, Osaka (JP)

(73) Assignee: Minolta Co., Ltd., Osaka (JP)

( * ) Notice: Subject to any disclaimer, the term of this patent is extended or adjusted under 35 U.S.C. 154(b) by 168 days.

(21) Appl. No.: 10/128,094

(22) Filed: Apr. 23, 2002

(65) Prior Publication Data

US 2003/0035101 A1 Feb. 20, 2003

(30) Foreign Application Priority Data

May 7, 2001 (JP) ........................................ 2001-136654

(51) Int. Cl.⁷ ................................................ G01J 1/42
(52) U.S. Cl. ....................... 356/218; 356/215; 356/404; 396/121; 396/292; 396/213
(58) Field of Search ........................ 356/218, 219–225, 356/213, 215, 404, 405, 406; 396/213, 287, 292, 121

(56) References Cited

U.S. PATENT DOCUMENTS

| 4,748,468 A | * | 5/1988 | Fujino et al. | ................ 396/121 |
| 5,486,914 A | * | 1/1996 | Denove et al. | ............. 356/221 |
| 5,678,079 A | * | 10/1997 | Ogawa | ........................ 396/234 |
| 6,509,963 B2 | * | 1/2003 | Oda et al. | .................... 356/218 |
| 6,714,293 B2 | * | 3/2004 | Goto et al. | ................. 356/219 |

FOREIGN PATENT DOCUMENTS

| JP | 05-056343 A | 3/1993 |
| JP | 06-281994 A | 10/1994 |
| JP | 11-355785 A | 12/1999 |
| JP | 2000-069327 A | 3/2000 |

* cited by examiner

Primary Examiner—Layla Lauchman
(74) Attorney, Agent, or Firm—Sidley Austin Brown & Wood LLP

(57) ABSTRACT

A photometric apparatus includes an exposure value calculator for calculating an exposure value based on light data from a photo sensor and an inputted photosensitivity; an exposure value difference calculator for calculating a difference between a calculated exposure value and a reference exposure value; a gamma characteristic provider, which provides a gamma characteristic concerning a relationship between the exposure value difference and a gradation value of digital data; a gradation calculator for calculating, based on the exposure value difference and the gamma characteristic, a gradation value of digital data in connection with an object having the calculated exposure value when the object is photographed at the reference exposure value; and an indicator for indicating the calculated gradation value of digital data in connection with the object.

19 Claims, 17 Drawing Sheets

FIG.16

| 71 | | 7 |
|---|---|---|
| Ref | f-No. Ref | 72 |
| 128 | | |
| 90 | 16 0 | |
| 64 | | |
| 45 | | |
| 32 | Time | |
| 22  71b | 125 | |
| 16 | | |
| 11 | Dv | |
| 8 | 245b | |
| 5.6 | | |
| 4 | 250g | |
| 2.8 | | |
| 2 | 245r | |
| 1.4 | | |
| 1 | | |

71a

PHOTOMETRIC APPARATUS

This application is based on patent application No. 2001-136654 filed in Japan, the contents of which are hereby incorporated by references.

BACKGROUND OF THE INVENTION

1. Field of the Invention

This invention relates to a photometric apparatus applicable to photographing with use of an electronic camera for recording images of an object in a recording medium such as a memory card by photo-electrically converting a light image of the object into electronic data, such as digital still camera, and digital video recorder.

2. Description of the Related Art

A camera records a light image of an object by focusing the light image on a focal plane by a lens and by exposing the focused image on a photosensitive member such as a film disposed on the focal plane. Since a film has photosensitive characteristics such as photosensitivity and characteristic curve, it is required to provide an optimal exposure amount for the film according to the characteristic of the film in order to obtain an optimal record image.

Generally, the range of brightness of light in the nature is remarkably wide compared to a reproducible range of brightness on a film. Accordingly, it is impossible to record the whole range of brightness of natural light on a film. In view of this, it has been a common practice in photographing to determine an exposure amount based on an idea that an object to be recorded has a reflectance of 18%, which is a mean value of light distribution in the nature, and that such an object is recorded at a density in an intermediate portion of the characteristic curve of the film and to designate the determined exposure amount as an optimal exposure amount.

As is well known, parameters for controlling the exposure amount of a camera include photosensitivity of a film, exposure period and aperture of the camera, and brightness of an object. Even if the brightness of an object is known, it is required to determine an exposure period or shutter speed for obtaining an optimal exposure and an aperture depending on the photosensitivity of the film. Hereafter, the shutter speed and the aperture are referred to as "exposure control values". It is not easy to calculate these exposure control values. In view of this, there has been produced a photometer for measuring a brightness of an object to calculate an optimal exposure control value based on the measurement result and the photosensitivity of the film.

Generally, photometers for measuring incident light on an object, and photometers for measuring reflected light from an object are used. These photometers are designed to calculate exposure control values (shutter speed Tv, aperture value Av [APEX value]) based on the following respective Equations (1), (2) for display.

$$Ev = Bv + Sv \quad (1) \text{ (Equation using reflected light)}$$
$$= Iv + Sv \quad (2) \text{ (Equation using incident light)}$$
$$= Av + Tv \quad (3)$$

where
Ev: exposure value
Sv: ISO sensitivity of film
Bv: brightness of object
Iv: illuminance of object The conventional photometer is adapted in photographing with a camera using a silver halide film. In photographing with use of such a photometer, an exposure value is calculated as an optimal exposure amount for a film. Specifically, in a silver halide film, after a latent image is formed by exposure, developing and fixing are performed prior to reproduction of a photographed image on the film. In such a processing, it is impossible to determine a correspondence between a brightness distribution of an object light image and a density distribution of a photographed image on the film prior to image reproduction. In view of this, an exposure amount of the film is determined based on the idea that an object image having a reflectance of 18% is recorded with a density in an intermediate portion of the characteristic curve of the film to facilitate setting of exposure control values.

In recent years, there have been rapidly developed electronic cameras incorporated with a solid-state image pickup device like CCD, such as digital still cameras and digital video recorders. Some of the electronic cameras have accomplished an image resolution as high as a corresponding performance of a camera using a silver halide film. The electronic cameras record an object image in a semiconductor memory or its equivalent by converting a brightness distribution of an object light image to digital data of gradations ranging from 0 to 255 in the case where 8-bit is used. In other words, the electronic cameras record an object light image in terms of gradation values corresponding to a density distribution of a photographed image on a film.

The above reveals that the electronic cameras can show a correspondence between a brightness distribution of an object light image (distribution in input data) and a density distribution of an image recorded in a recording medium (distribution in output data) and enable a photographer to evaluate an exposure in terms of a record image in photographing. Obtaining such information is desirable for the photographer because the photographer can evaluate the exposure in terms of a record image (such as a gradation characteristic and a gradation range of a record image) as well as in terms of exposure control values.

However, the conventional photometer has a limitation that merely an exposure control value is calculated based on an optimal exposure amount on a film. Applying the conventional photometer to an electronic camera such as a digital still camera fails to obtain information that enables a photographer to evaluate an exposure in terms of a record image. Particularly, a solid-state image pickup device of an electronic camera has a narrower dynamic range than a silver halide film, and a characteristic of the solid-state image pickup device corresponding to a characteristic curve of a silver halide film is different from that of the silver halide film. Accordingly, it is not easy to apply measurement results of the conventional photometer to an electronic camera while utilizing the techniques and knowledge concerning exposure control with respect to a silver halide film. Despite the fact that there has been a demand for a photometric apparatus for use with an electronic camera considering the recording system of the electronic camera, such a photometric apparatus has not been proposed or available.

SUMMARY OF THE INVENTION

It is an object of the present invention to provide a photometric apparatus which is free from the problems residing in the prior art.

According to an aspect of the invention, a photometric apparatus which includes a photo sensor for outputting light data in accordance with an intensity of the sensed light allows photosensitivity data to be inputted. The apparatus calculates an exposure value based on light data from the photo sensor and the inputted photosensitivity, and allows a particular calculated exposure value to be designated as a reference exposure value for an actual photographing, and calculates a difference between a calculated exposure value and the reference exposure value. The apparatus is further provided with a gamma characteristic provider for providing a gamma characteristic concerning a relationship between the exposure value difference and a gradation value of digital data, a gradation calculator for calculating, based on the exposure value difference and the gamma characteristic, a gradation value of digital data in connection with an object having the calculated exposure value when the object is photographed at the reference exposure value. The calculated gradation value of digital data in connection with the object is indicated on a proper portion of the apparatus.

According to another aspect of the invention, a photometric apparatus is provided with a photo sensor for separating sensed light into at least three color components to output light data in accordance with an intensity of the light with respect to each color component, and a receiver for allowing photosensitivity data with respect to each color component to be inputted. The apparatus calculates an exposure value based on light data from the photo sensor and the photosensitivity data with respect to each color component, and calculates an exposure control value for exposure control by using a calculated exposure value with respect to each color component. The apparatus is further provided with a receiver for allowing a particular calculated exposure control value to be designated as a reference exposure value for an actual photographing, and an exposure value difference calculator for calculating a difference between a calculated exposure value with respect to each color component and the reference exposure value, and a gamma characteristic provider for providing a gamma characteristic concerning a relationship between the exposure value difference and a gradation value of digital data with respect to each color component, and a gradation calculator for calculating, based on the exposure value difference and the gamma characteristic, a gradation value of digital data in connection with an object having the calculated exposure value with respect to each color component when the object is photographed at the reference exposure value, and an indicator for indicating the calculated gradation value of digital data with respect to each color component.

These and other objects, features and advantages of the present invention will become more apparent upon a reading of the following detailed description and accompanying drawings.

BRIEF DESCRIPTION OF THE DRAWINGS

FIG. 16 is a diagram exemplarily showing display contents on a display portion of a photometric apparatus for color photography;

DETAILED DESCRIPTION OF THE PREFERRED EMBODIMENTS OF THE INVENTION

Figure 1:
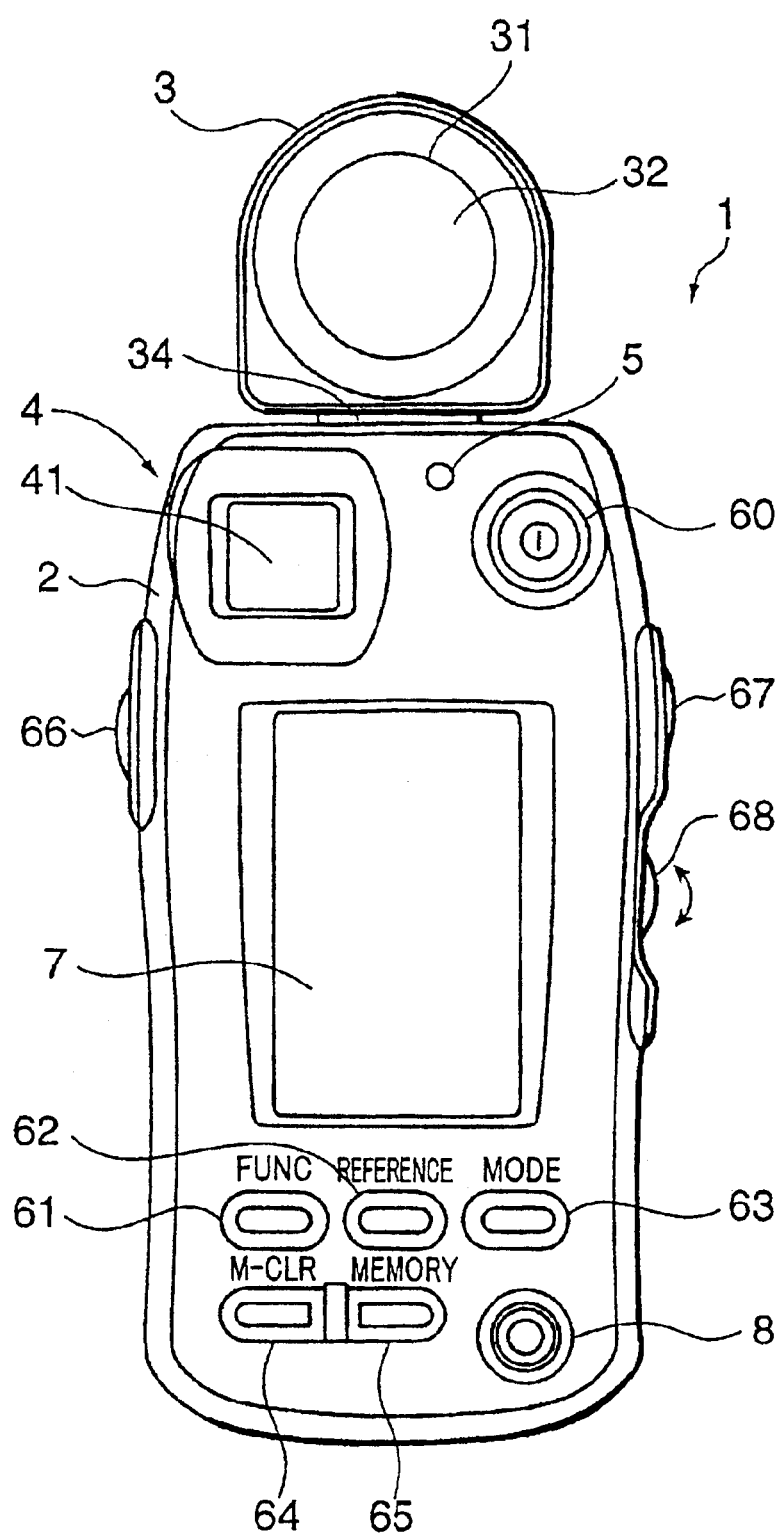
FIG. 1 is a front view showing an external appearance of a photometric apparatus according to an embodiment of the invention.
Figure 2:
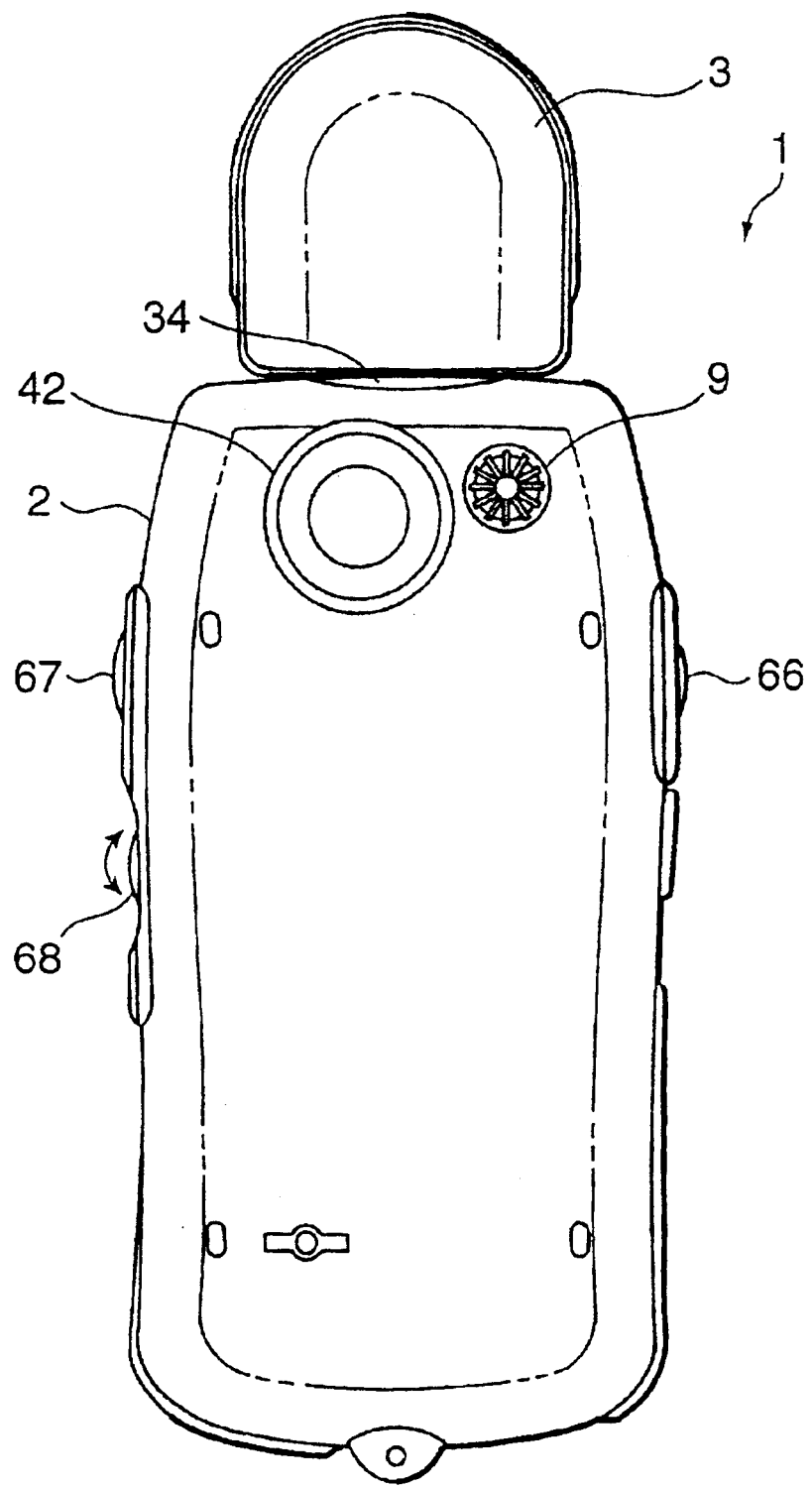
FIG. 2 is a rear view of the photometric apparatus.
Figure 3:
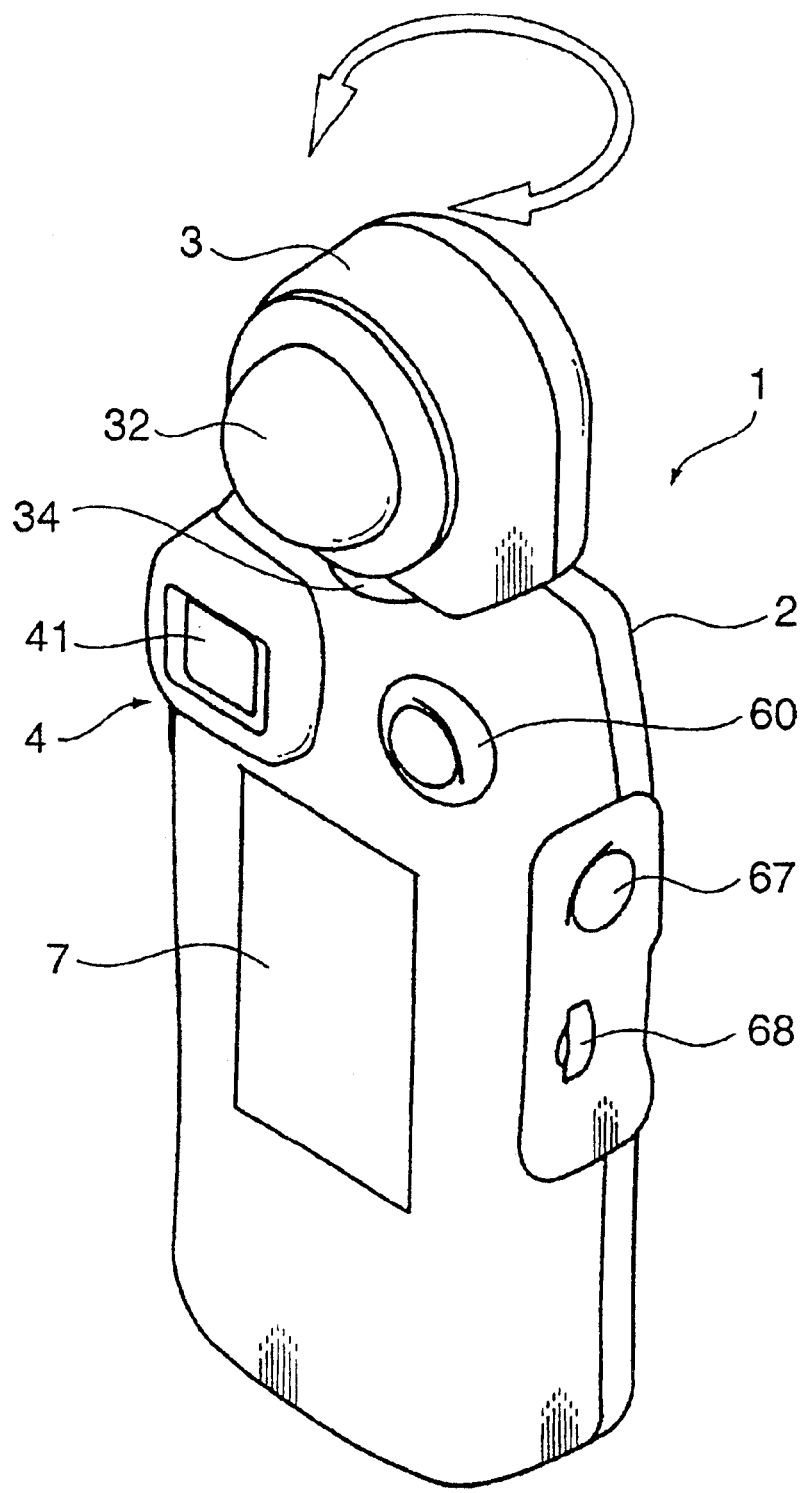
FIG. 3 is a perspective view of the photometric apparatus.

Referring to FIGS. 1 to 3, a photometric apparatus 1 has a function of obtaining a gradation value of an image to be recorded at a measurement point based on an exposure value and a recording characteristic, which corresponds to a characteristic curve of a film, in an electronic camera, in addition to a function of measuring brightness or illuminance of an object image to calculate an exposure value such as exposure period, aperture value based on the measurement and a predetermined photosensitivity of a film.

A characteristic curve of a film shows an exposure amount on the film in terms of a density of a photographed image by setting a photographic density D on the ordinate and a logarithmic value (logE) of the exposure amount on the abscissa. The characteristic curve differs depending on the kind of film, and accordingly, an absolute value with respect to a photographic density D cannot be determined. Therefore, a photographic density cannot be calculated based on an exposure amount in photographing an image on a film.

In an electronic camera, exposure amounts are converted to an electric analog signal by photoelectric converting elements, which in turn are A/D converted to digital signals of a certain bit number for recording in a recording medium. The digital signals are data representing gradation values. In this case, a gradation range of an image to be recorded is determined depending on the bit number of data that is to be A/D converted, e.g., the gradation ranging from 0 to 255 in case of 8-bit data. Further, image signals output from the photoelectric converting element are A/D converted in such a manner as to optimally reflect a density distribution of a photographed image or level distribution of light amounts received by photoelectric converting elements within a predetermined gradation range.

Specifically, the electronic camera has a characteristic corresponding to a characteristic curve of a film, that is, a characteristic showing a relationship between an amount incident on the photoelectric converting element and a record level of a record image, namely, a gamma characteristic showing a relationship between an input level to the photoelectric converting element and an output level to a recording medium. Utilizing this gamma characteristic, an image signal from the photoelectric converting element corresponding to an exposure amount is converted to data of a record image having certain gradation values.

In other words, as long as an electronic camera is provided with a characteristic corresponding to a characteristic curve of a film, a density or gradation value of an image to be recorded can be calculated based on an exposure amount to the photoelectric converting element. The photometric apparatus is in advance provided with a conversion table regarding a gamma characteristic which is usually provided as standard tool in an electronic camera such as digital still camera, or a conversion equation or a conversion table to be described later with respect to FIG. 14. Alternatively, the photometric apparatus is provided with a conversion table regarding a gamma characteristic which is loaded by a photographer. In this way, gradation values or digital count values of a record image are calculated based on an exposure value or exposure amount measured at each measurement point and the provided gamma characteristic conversion table.

The photometric apparatus 1 is designed to selectively perform measuring of incident light and measuring of reflected light. The photometric apparatus 1 includes a thin, elongated and substantially rectangular main body 2 equipped with a reflected light measurement portion 4 for measuring reflected light, and an incident light sensing portion 3 provided at an upper end of the main body 2 for measuring incident light. The light sensing portion 3 is rotatably mounted on the main body 2 about a longitudinal axis thereof via a mounting portion 34 as shown in FIG. 3. The light sensing portion 3 is made to be rotatable to keep the main body 2 held in a certain orientation from blocking incident light to be measured.

The light sensing portion 3 has a thin box-like shape having a bell-like configuration in front view, and includes a circular light receiving window 31 in a front surface thereof. The light sensing portion 3 is provided with a cover member 32 having a certain light transmittance and diffusiveness to cover the light receiving window 31. A light sensor is provided at an inner periphery of the light receiving window 31 to receive light that has passed through the cover member 32. Preferably, the cover member 32 includes a light receiving bulb having a cardioid type light receiving angle characteristic I such that $I=I_0 \cdot (1+\cos \theta)/2$ in the case of measuring a light image of a three-dimensional object such as a person and includes a light receiving plate having a cosine type light receiving angle characteristic I such that $I=I_0 \cdot \cos \theta$.

The main body 2 has such a size and configuration for a user or photographer to easily hold and manipulate the photometric apparatus 1 with one hand. A viewfinder window 41 for the reflected light measurement portion 4 is formed in a left side on an upper front portion of the main body 2, and an external light sensor 5 and a power source key 60 are provided next to the right of the viewfinder window 41 on the main body 2 in this order. The external light sensor 5 detects brightness around the object so as to control on/off of a backlight device 73 of an LCD 7 (see FIG. 12). The external light sensor 5 includes a silicon photodiode, for example, and senses external light and to convert the light into an electric signal corresponding to the light intensity for output. The image signal is output from a controller 12 (see FIG. 12). When it is detected that the level of the image signal is lower than a predetermined level, namely, the vicinity of the object is dark, the controller 12 controls to turn the backlight device 73 on so that a user can view the display contents on the LCD 7 with ease. The power source key 60 is an operation key with which a user is enabled to activate and suspend the operation of the photometric apparatus 1. Each time the power source key 60 is depressed, the photometric apparatus 1 is alternately activated or turned on, and suspended its operation or turned off.

The display portion 7 (hereinafter, referred to as "LCD 7") including a vertically elongated liquid crystal display screen is provided in the middle on the front surface of the main body 2. A function selecting key 61, a reference measurement setting key 62, and a measurement mode setting key 63; and a memory clearing key 64, and a memory key 65 are provided at a lower portion of the main body 2 in two rows. A synchronizing terminal 8 is provided at a lower right corner of the main body 2. The synchronizing terminal 8 connects the main body 2 to a synchronizing cable in measurement light under flashlight.

Figure 5:
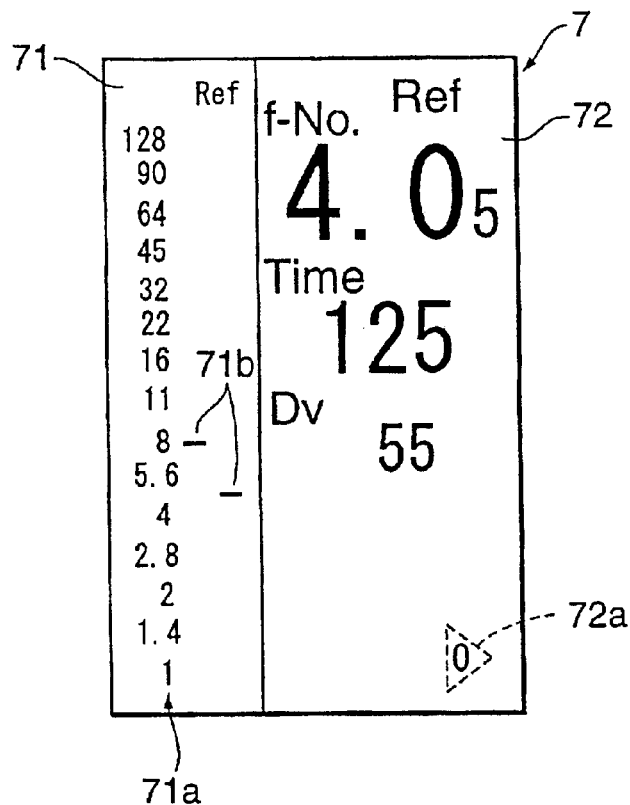
FIG. 5 is a diagram exemplarily showing display contents regarding measurement results on a display portion of the photometric apparatus.

The LCD 7 displays information for setting measurement conditions, as well as measurement results. FIG. 5 is a diagram exemplarily displaying contents regarding measurement results. In this embodiment, the LCD 7 is composed of a liquid crystal of segment type. The LCD 7 is provided with an analog display portion 71 at a left side on the screen thereof for displaying an exposure value on an f-number scale 71a, and a digital display portion 72 at a right side thereon for displaying photometric values such as an aperture value (f-number), and a digital count value (Dv), and set values such as a measurement mode which constitutes measurement conditions, and a shutter speed (Time).

The numerical values "1, 1.4, 2, . . . , 90, 128" on the analog display portion 71 are indices on the f-number scale 71a for indicating exposure values in terms of f-number. An indication "In" which indicates that display contents are photometric values of incident light and an indication "Ref" which indicates that display contents are photometric values of reflected light are provided at an upper end on the analog display portion 71. The indication "In" is turned on when measurement is performed according to the incident light measurement, whereas the indication "Ref" is turned on when measurement is performed according to the reflected light measurement. Referring to FIG. 5, since measurement is performed according to the reflected light measurement, the indication "Ref" is turned on or displayed, whereas the indication "In" is turned off or disappeared.

A display section for displaying a reference exposure value and a display section for displaying a certain exposure value are provided next to the right of the f-number scale 71a in this order. The reference exposure value and the certain exposure value are displayed on the respective display sections by turning a corresponding bar-like display segment 71b on at a location corresponding to an index on the f-number scale 71a. In FIG. 5, the reference exposure value is displayed as f-No.=8, and the certain exposure value is displayed as f-number≒4.8 (corresponding to 4.5 in terms of APEX value Av).

Figure 11:
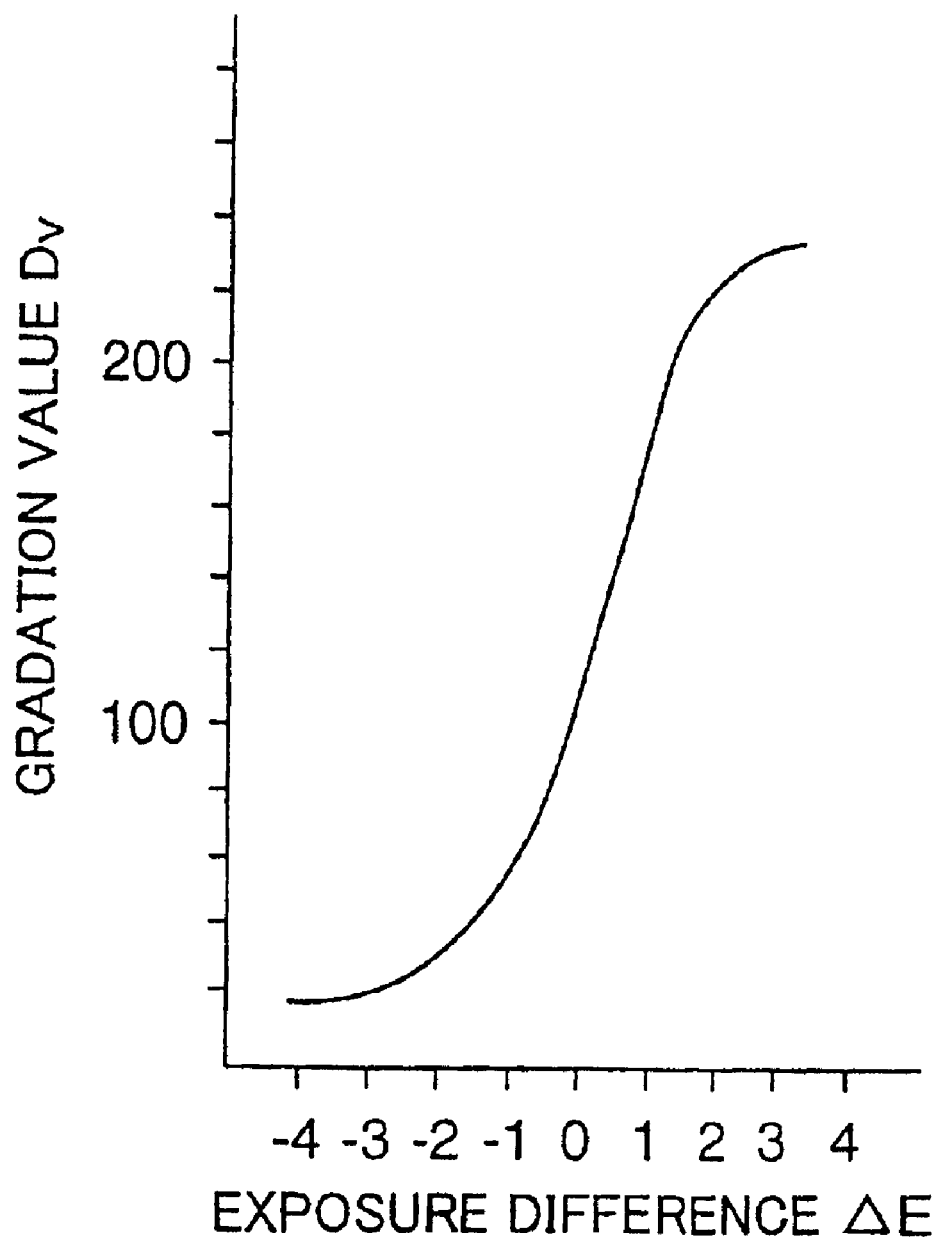
FIG. 11 is a graph exemplarily showing a gamma characteristic generated in gradation value lookup table mode.

As mentioned above, the photometric apparatus 1 calculates a gradation value of a record image based on exposure values measured at respective measurement points and a prepared gamma characteristic conversion table. It should be noted, however, that as shown in FIG. 11, in a gamma characteristic conversion table, a difference in exposure ΔEv is set on the abscissa, and a gradation value Dv is set on the ordinate to convert an exposure difference ΔEv to a corresponding gradation value Dv. Accordingly, it is necessary to convert exposure values Ev at respective measurement points to corresponding exposure differences ΔEv prior to using the gamma characteristic conversion table. The reference exposure value is an exposure value specified by a user as a reference value among the exposure values measured at plural measurement points in order to convert the exposure values Ev at the respective measurement points to the corresponding exposure differences ΔEv. The certain exposure value is a value that has not been specified as the reference exposure value. The reference exposure value is a value used for exposure control in photographing. Accordingly, in the case where an exposure value at a given measurement point has been specified as the reference exposure value, an exposure difference ΔEv at the measurement point is ΔEv=0, whereas in the case where an exposure value at a given measurement point has been set as the certain exposure value, the exposure difference ΔEv at the measurement point is ΔEv>0 or ΔEv<0.

Referring back to FIG. 5, there are provided an indication "In" and an indication "Ref" at an upper end on the digital display portion 72 to indicate that display contents show measurement results according to the incident light measurement and the reflected light measurement, respectively. Since FIG. 5 shows exemplary measurement results according to the reflected light measurement, the indication "Ref" is turned on, whereas the indication "In" is turned off. Numerals attached to the indications "f-No.", "Time", and "Dv" on the digital display portion 72 respectively show a measured exposure value, and a set shutter speed, and a digital count value.

Referring to FIG. 5, in the section of f-number on the digital display portion 72 is shown a digital count value corresponding to a certain exposure value between "4" and "5.6" on the analog display portion 71. In the numeral "4.05" of "f-No.", the large-sized number "4.0" shows a numerical value immediately below the index indicated by the right-side bar-like display segment 71b on the f-number scale 71a, and the small-sized number "5" shows a median of the adjacent values with respect to the right-side bar-like display segment 71b on the f-number scale 71a when the value is scaled down by 0.1 stepwise. Namely, the numeral "4.05" corresponds to the APEX value Av=4.5 and the aperture value f-number≒4.8. An exposure difference ΔEv between the reference exposure value and a certain exposure value is obtained by reading a difference in scale indicated by the bar-like display segments 71b on the f-number scale 71a on the analog display portion 71.

"125" on the indication "Time" shows that the shutter speed is "1/125 (sec)", and "55" on the indication "Dv" shows that a gradation value (digital count value) of an image is "55" when the image is exposed under the conditions that f-number≒4,8 and the shutter speed=1/125.

Further, a warning indication "0" is provided on the digital display portion 72 to alert when the digital count value Dv is beyond an allowable range corresponding to a region under a straight line part of a gamma characteristic, or corresponding to a latitude of a film. An upper limit gradation value Dvh of the allowable range, corresponding to a curved line part of the gamma characteristic, and a lower limit gradation value Dvl of the allowable range, corresponding to another curved line part of the gamma characteristic, are arbitrarily settable by a user. For instance, in the case where a recording range is from "0 to 255" in gradation distribution, the upper limit gradation value Dvh=245, and the lower limit gradation value Dvl=45, the indication "0" is turned on when Dv>245 or Dv<45 to alert the user. In FIG. 5, since Dv=55, the warning indication is not turned on ("0" enclosed by the broken lines of a triangle shows that the indication is in an off-state).

Figure 6:
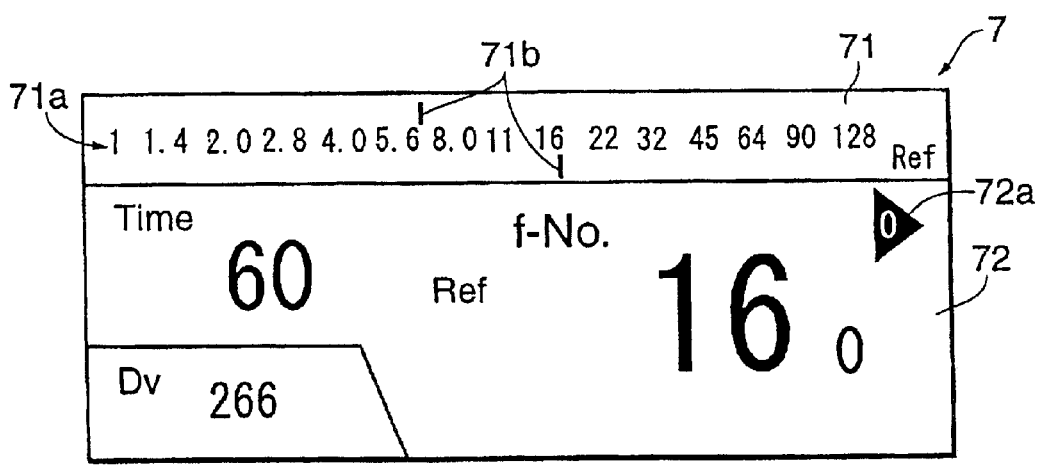
FIG. 6 is a diagram exemplarily showing display contents on a laterally elongated display screen of the photometric apparatus.

In this embodiment, since the LCD 7 has the vertically elongated display screen, measurement results are shown vertically. Alternatively, in the case where the LCD 7 has a laterally elongated display screen, measurement results may be displayed laterally as shown in FIG. 6. In FIG. 6, an analog display portion 71 is provided on an upper part on the display screen, and a digital display portion 72 is provided on a lower part thereon. In FIG. 6, since Dv=266>Dvh(=245), a warning indication "0" is turned on.

The function selecting key 61 is an operation key which allows a user to selectively designate various settings regarding mode such as ISO sensitivity, shutter speed, gradation bit number, gamma value, upper and lower limit gradation values, and gradation value lookup table. Sequentially depressing the function selecting key 61 each time for a certain duration cyclically changes the modes one from another from ISO sensitivity→shutter speed→gradation bit number→gamma value→gradation limit→gradation value lookup table→ISO sensitivity in this order. A user is notified of changeover of the mode by change of the display contents on the LCD 7. When one of the modes is selected, a user can selectively designate a numerical value in association with the selected mode by turning an operation dial 68 in the direction of the arrow in FIG. 1.

Figure 7:
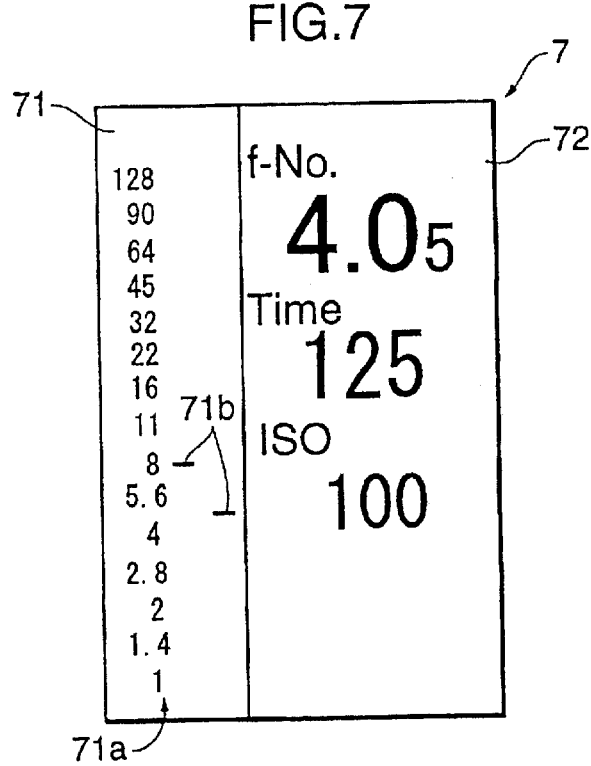
FIG. 7 is a diagram showing an exemplary display state of the display portion when ISO sensitivity mode is designated.

For instance, when the ISO sensitivity mode is designated, the display contents on the LCD 7 are changed to the one as shown in FIG. 7, and one of the numerical values (10, 12, . . . , 80, 100, 125, . . . , 1000, 1250, . . . ) of the ISO sensitivity that have been prepared in advance is displayable in the display section "ISO". For example, turning the operation dial 68 in an upward direction in FIG. 1 increments the numerical value, whereas turning the operation dial 68 in a downward direction in FIG. 1 decrements the numerical value. Thus, display of a desired numerical value enables to set the ISO sensitivity at the displayed value. In FIG. 7, the ISO sensitivity is set at "100". In FIG. 7, since the ISO sensitivity mode is designated during measurement, exposure values (f-No.=4.05, Time=125) are also displayed as measurement results. It should be noted that an exposure value is not displayed at an initial setting before start of measurement.

The shutter speed is set in a similar manner as setting the ISO sensitivity. Specifically, when the shutter speed setting mode is designated, one of the numerical values ( . . . , 2, 4, . . . , 125, 250, . . . , 1000, 2000, . . . ) of the exposure period that have been prepared in advance is displayable in the display section "Time". A desired number is displayed by manipulating the operation dial 68, and then set as a shutter speed.

The gradation bit number setting mode is a mode for setting a bit number for record image data or a gradation number. Since the bit number of data of a record image differs depending on type of electronic camera (e.g., 8-bit, 10-bit, 12-bit), it is required to change the gradation number in terms of a digital count value with respect to a gamma characteristic. The gradation bit number is settable considering the above. The gradation bit number is set in a similar manner as setting the ISO sensitivity. Specifically, when the gradation bit number setting mode is designated, one of three gradation bit numbers, 8, 10, and 12, that have been prepared in advance is displayable in the display section "gradation bit number". A desired number is displayed by manipulating the operation dial 68, and then set as a gradation bit number.

Figure 8:
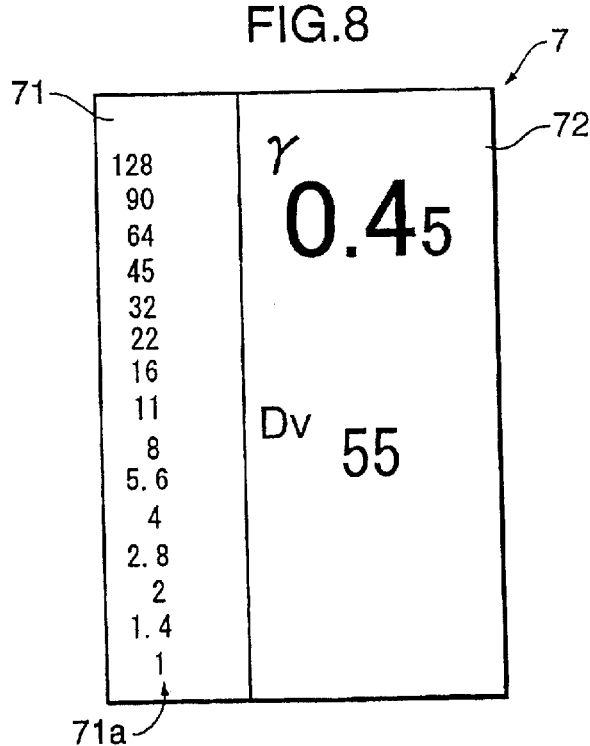
FIG. 8 is a diagram showing an exemplary display state of the display portion when gamma value setting mode is designated.
Figure 14:
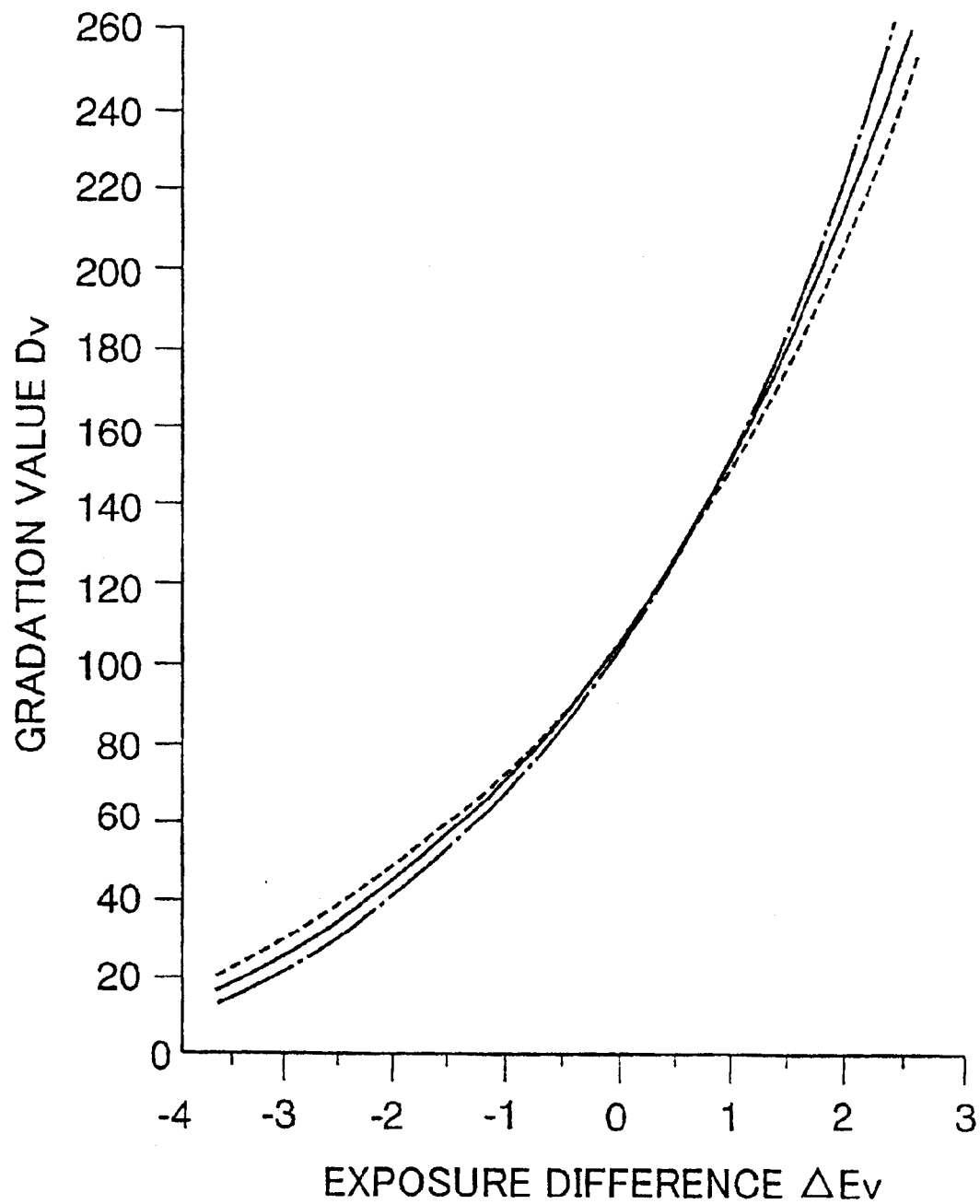
FIG. 14 is a graph exemplarily showing a gamma characteristic based on which a digital count value is obtained by using an exposure difference.

The gamma value setting mode is a mode for setting a gamma value of the gamma characteristic. The photometric apparatus 1 is provided with a plurality of gamma characteristics each having a different gamma value, as shown in FIG. 14. With this arrangement, a photographer is enabled to select one of the gamma characteristics. The gamma value is set in a similar manner as setting an ISO sensitivity. Specifically, when the gamma value setting mode is designated, the display contents on the LCD 7 are changed to the one as shown in FIG. 8. Then, one of the three gamma values, 0.42, 0.45, and 0.48, that have been prepared in advance is displayable in the display section "γ". A desired number is displayed by manipulating the operation dial 68, and then set as a gamma value. In FIG. 8, the gamma value is set at "0.45". It should be noted that in FIG. 8, since the gamma value setting mode is designated during measurement, the gradation value Dv is also displayed as a measurement result. It should be noted that a gradation value is not displayed at an initial setting before start of measurement.

Figure 9:
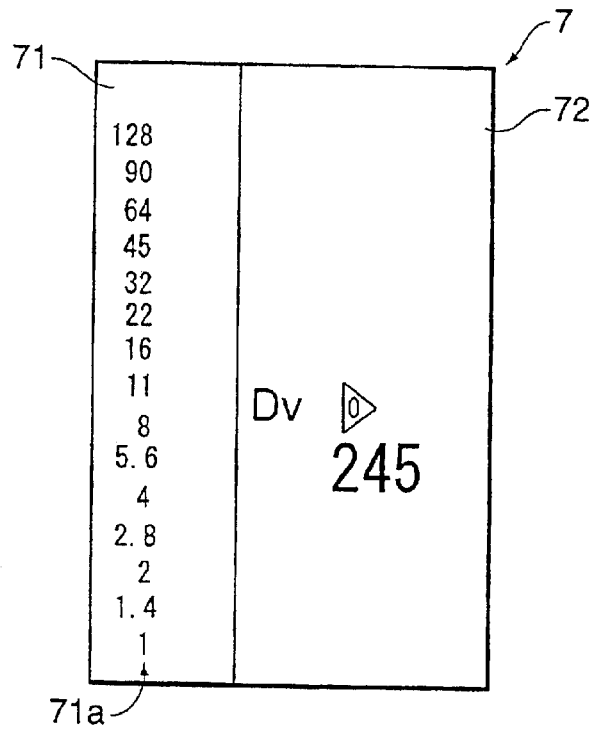
FIG. 9 is a diagram showing an exemplary display state of the display portion when gradation limit setting mode is designated.

The gradation limit setting mode is a mode for setting an allowable range of the digital count value Dv. The gradation limit value is set in a similar manner as setting the ISO sensitivity. Specifically, when the gradation limit setting mode is designated, the display contents on the LCD 7 are changed to the one as shown in FIG. 9, and one of a plurality of numerical values (235, 240, 250, . . . ) that have been prepared in advance is displayable in the display section "Dv 0" consisting of "Dv" and a triangular portion next to the right of "Dv" with "0" enclosed therein. The example of FIG. 9 shows a state that merely the upper limit gradation value Dvh is settable and that the display section "Dv 0" displays the upper limit gradation value. A desired number is displayed by manipulating the operation dial 68, and then set as an upper limit gradation value. In FIG. 9, the upper limit gradation value is set at "245".

As mentioned above, both the upper limit gradation value Dvh and the lower limit gradation value Dvl are settable. In such a case, the upper limit gradation value Dvh is displayed on an upper part on the display section "Dv", whereas the lower limit gradation value Dvl is displayed on a lower part thereon. Settings of the upper limit gradation value Dvh and the lower limit gradation value Dvl are changed over by, e.g., pressing the reference measurement setting key 62.

The gradation value lookup table setting mode is a mode for generating a desired gamma characteristic for a user or photographer. As will be described later, a plurality of characteristics (see FIG. 10) each showing a relationship between an exposure difference ΔEv and a gradation value Dv and using gamma as a parameter are prepared in the photometric apparatus 1. The characteristic is prepared by implementing computation or by using a conversion table or gradation value lookup table obtained by implementing such computation. The gradation value lookup table setting mode is provided considering a case that a user may wish to set a characteristic showing a relationship between an exposure difference ΔEv and a gradation value Dv, for example, as shown in FIG. 11, in addition to a reference gradation value lookup table prepared in advance.

Figure 10:
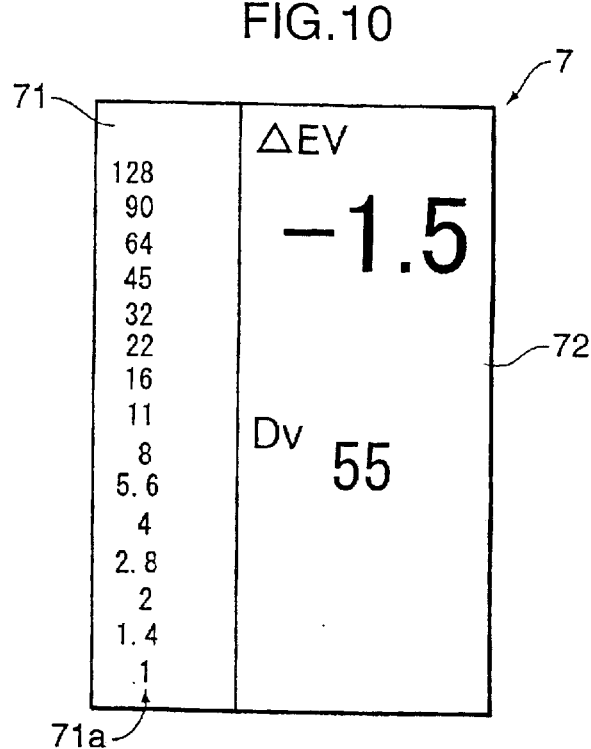
FIG. 10 is a diagram showing an exemplary display state of the display portion when gradation value lookup table setting mode is designated.

When the gradation value lookup table setting mode is designated, the reference measurement key 62 is operable as a key for setting an exposure value ΔEv on the abscissas. The operation dial 68 is operable as a dial for setting a gradation value on the ordinate. Specifically, when the gradation limit setting mode is designated, the display contents on the LCD 7 are changed to the one as shown in FIG. 10, and one of numerical values (−4, −3.5, . . . , −0.5, 0, +0.5, . . . , +3.5, +4.0) that have been prepared in advance is displayable in the display section "ΔEv", and one of numerical values (0, 1, 2, . . . , 256, . . . , 512, . . . , 1024, . . . , 2048, . . . , 4096) that have been prepared in advance is displayable in the display section "Dv". Each time the reference measurement key 62 is depressed, the displayed value on "ΔEv" is changed to allow a user to set a gradation value Dv corresponding to the displayed ΔEv. The gradation value Dv is changed in response to manipulation of the operation dial 68 to thereby set the displayed value as a gradation value corresponding to the displayed ΔEv. In FIG. 10, the gradation value Dv is set at "55" in response to setting of ΔEv=−1.5.

As mentioned above, setting a gradation value Dv in correspondence to each of the coordinate values of ΔEv generate a desirable gradation value lookup table. Upon generating the gradation value lookup table in the gradation value lookup table setting mode, the reference gradation value lookup table that has been prepared in advance is replaced with the newly generated gradation value lookup table. A gradation value lookup table is usually generated at a start of measurement. Alternatively, such a table may be generated during measurement. In the case where the gradation value lookup table setting mode is designated during measurement, a desired gradation value lookup table is created by revising the whole or part of the currently-used gradation value lookup table.

Referring back to FIG. 1, a reflected light measurement key 66 is provided at an upper left side part of the main body 2, and an incident light measurement key 67 is provided at a right side part of the main body 2 generally at the same height position as the reflected light measurement key 66. The operation dial 68 is provided below the incident light measurement key 67. A light receiving window 42 for the reflected light measurement portion 4 is formed in a rear surface of the main body 2, and a diopter regulating dial 9 is provided next to the right of the light receiving window 42 in FIG. 2.

Figure 12:
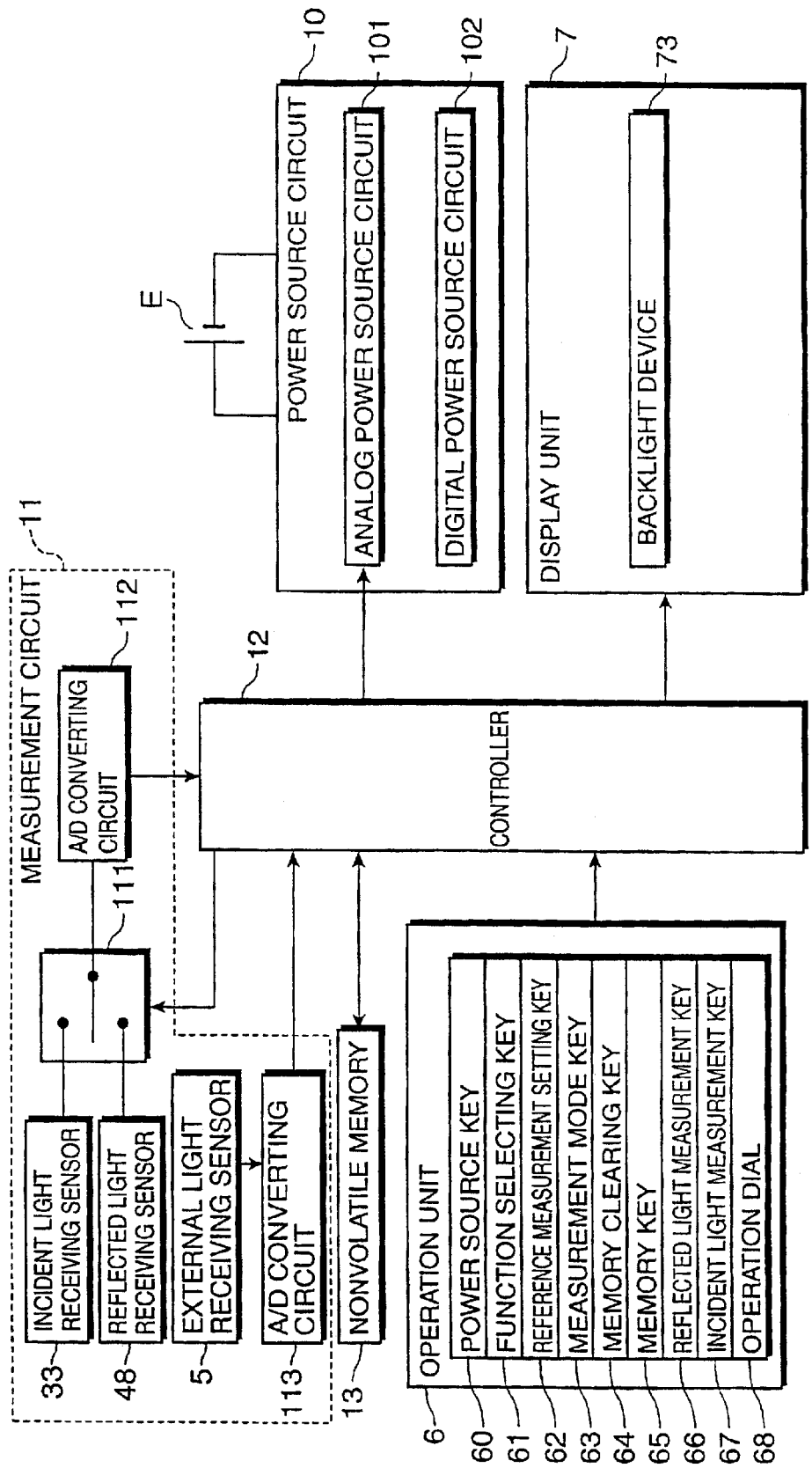
FIG. 12 is a block diagram showing an electrical configuration of the photometric apparatus.

The operative members 60 through 68 constitute an operation unit 6 as shown in FIG. 12. The controller 12, which is described later, detects operations of the operative members 60 through 68 and controls operations thereby.

Figure 4:
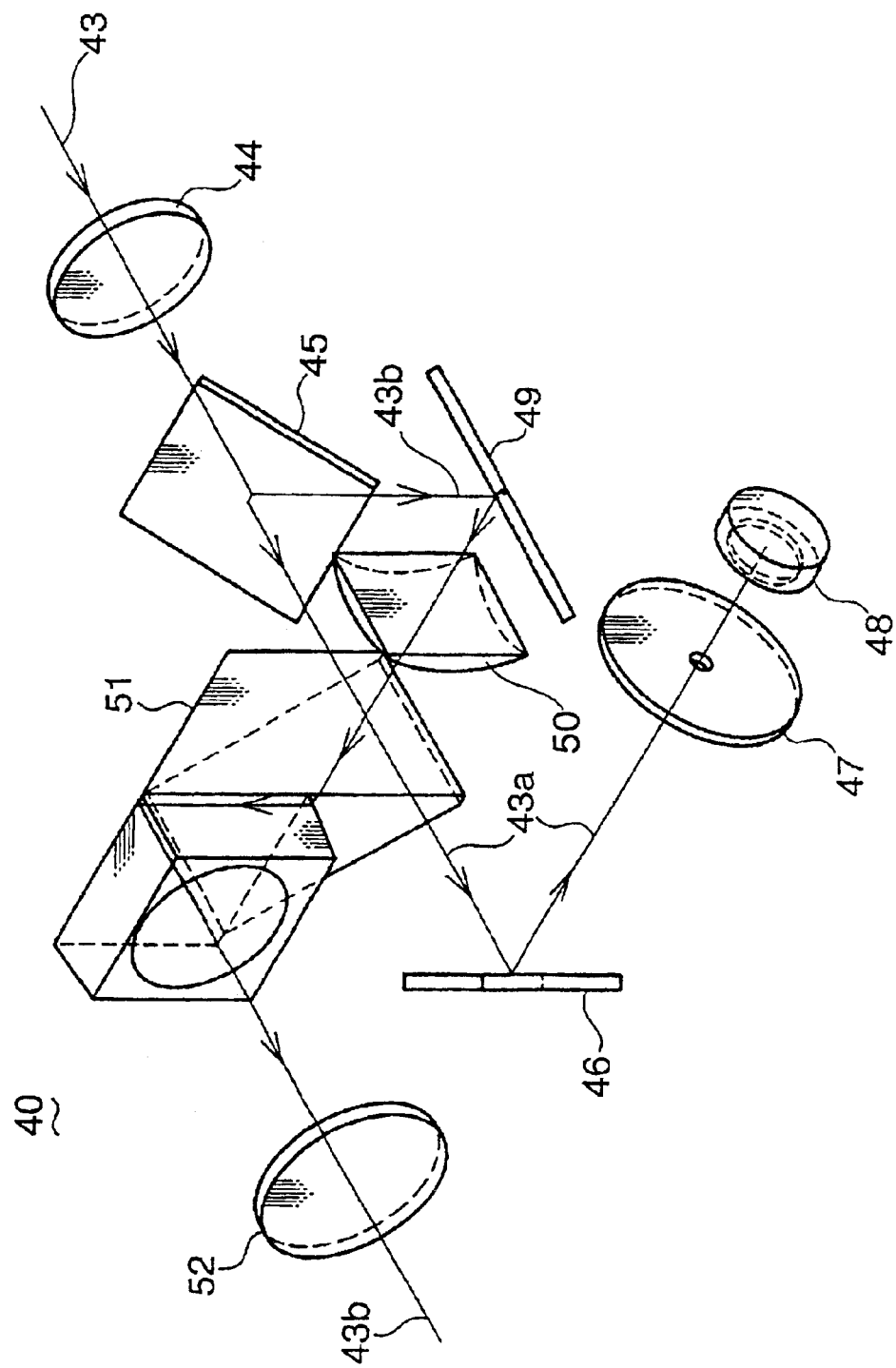
FIG. 4 is a perspective view showing a schematic arrangement of an optical system for measuring reflected light.

An optical system 40 according to reflected light measurement is provided in the main body 2 between the viewfinder window 41 and the light receiving window 42. FIG. 4 is a perspective view showing a schematic arrangement of the reflected light measurement optical system 40.

The reflected light measurement optical system 40 includes a light measurement optical unit for guiding reflected light from an object toward a reflected light sensor 48 in order to measure the reflected light from the object, and a viewfinder optical unit for guiding the reflected light from the object toward the viewfinder window 41 in order to allow a user to verify the measurement point on the object. An objective lens 44, a semitransparent mirror 45, a full-reflective mirror 46, a diaphragm 47, and the reflected light sensor 48 constitute the light measurement optical unit. The objective lens 44, the semitransparent mirror 45, a full-reflective mirror 49, a condenser lens 50, a prism 51, and an eyepiece lens 52 constitute the viewfinder optical unit.

Reflected light 43 from an object is incident upon the objective lens 44 through the light receiving window 42 for convergence, and separated into a beam of light 43a for measurement and a beam of light 43b for verifying a measurement point by the semitransparent mirror 45. The beam of light 43a is reflected by the full-reflective mirror 46, and is guided to the reflected light sensor 48 through the diaphragm 47.

The beam of light 43b is reflected by the full-reflective mirror 49, and is condensed on the condenser lens 50. After condensed on the condenser lens 50, the beam of light 43b is incident upon the eyepiece lens 52 after changing its direction by the prism 51. Then, the beam of light 43b is emerged out of the main body 2 through the viewfinder window 41 shown in FIG. 1.

FIG. 12 is a block diagram showing an electrical configuration of the photometric apparatus 1. It should be noted that elements in FIG. 12 identical to those in FIGS. 1 and 2 are denoted at the same reference numerals. The photometric apparatus 1 includes a power source circuit 10, a light measurement circuit 11, the controller 12, a nonvolatile memory 13, a display unit 7, and the operation unit 6.

The power source circuit 10 includes an analog power source circuit 101 for supplying power to the light measurement circuit 11 which is operated based on an analog signal, and a digital power source circuit 102 for supplying power to the nonvolatile memory 13, the display unit 7, the controller 12, and the operation unit 6 all of which are operated based on an digital signal. Upon receiving power supply from a battery E, the power source circuits 101, 102 each generate power of a certain voltage to supply the power to the respective parts of the circuits 101, 102. The analog power circuit 101 suspends its operation in response to a control signal from the controller 12.

The light measurement circuit 11 includes the external light sensor 5, an incident light sensor 33, the reflected light sensor 48, a sensor switchover section 111, and A/D converting circuits 112, 113 each capable of executing a function of integration. The incident light sensor 33 and the reflected light sensor 48 each output an electric signal corresponding to a received light intensity, and is composed of, for example, silicon photodiode. The reflected light sensor 48 is designed to allow reflected light from an object for measurement to be incident thereupon. The incident light sensor 33 is designed to allow 18% of light amount relative to the whole light on the object to be incident thereupon.

The sensor switchover section 111 is provided between the incident light sensor 33 and the reflected light sensor 48, and the A/D converting circuit 112 to changeably connect the sensor 33 (or sensor 48) to the A/D converting circuit 112. The controller 12 controls the switchover operation of the sensor switchover section 111.

Upon receiving information regarding operation of the reflected light measurement key 66 through the operation unit 6, the controller 12 controls the sensor switchover section 111 to connect the A/D converting circuit 112 to the reflected light sensor 48. Upon receiving information regarding operation of the incident light measurement key 67 through the operation unit 6, the controller 12 controls the sensor switchover section 111 to connect the A/D converting circuit 112 to the incident light sensor 33. In the case where measurement of reflected light is designated, an analog image signal output from the reflected light sensor 48 is converted to a digital signal of a certain bit number by the A/D converting circuit 112, and output to the controller 12 as light reception data. On the other hand, in the case where measurement of incident light is designated, an analog image signal output from the incident light sensor 33 is converted to a digital signal of a certain bit number by the A/D converting circuit 112, and output to the controller 12 as light reception data. Exposure values (Time, f-number) according to the reflected light measurement or the incident light measurement, and a gradation value (digital count value) Dv are calculated for display on the display unit 7.

In FIG. 12, the incident light sensor 33 and the reflected light sensor 48 are each directly connected to the sensor switchover section 111 with the A/D converting circuit 112 interposed between the sensor switchover section 111 and the controller 12. Alternatively, an A/D converting circuit may be provided between the incident light sensor 33 and the sensor switchover section 111, and another A/D converting circuit may be provided between the reflected light sensor 48 and the sensor switchover section 111 to directly connect the sensor switchover section 111 to the controller 12.

A signal corresponding to brightness around the object output from the external light sensor 5 is converted to a digital signal of a certain bit number by the A/D converting circuit 113, and output to the controller 12 as light reception data. The controller 12 compares the light reception data with a predetermined threshold value and turns the backlight device 73 on when it is judged that the light reception data is smaller than the threshold value by determining that the background around the object is dark.

The nonvolatile memory 13 includes an EEPROM, and stores a control program in a CPU of the controller 12 including pre-stored data, and data obtained by implementing computation in the controller 12.

The controller 12 provided with the CPU controls various operations of the constituent parts of the controller 12. Specifically, the controller 12 outputs a control signal to the analog power source circuit 101 and the light measurement circuit 11 based on manipulation of the operational keys of the operation unit 6 for control of various parts, and outputs a control signal to the display portion 7 for control of display format on the display portion 7. Further, the controller 12 calculates exposure values (Time, f-number) based on light reception data from the incident light sensor 33 or the reflected light sensor 48 via the A/D converting circuit 112, and calculates a gradation value Dv.

Next, a gradation value lookup table for obtaining a digital count value based on light reception data is described.

In electronic cameras such as digital still cameras, a density of a record image is represented in terms of a numerical value and recorded as such in a recording medium. At this time, a range of the numerical values with respect to the density is determined depending on the number of gradations that are determined based on the bit number of digital data. For instance, in case of 8-bit data, data of a photographic image is converted to a gradation value ranging from 0 to 255 for recording.

In providing information as to at which digital count value Dv a photographic image is to be recorded based on the brightness of an object, as information regarding exposure in photographing with an electronic camera, it is necessary to convert photometric values at measurement points on the object to respective digital count values in a record image. There is found the following gradation conversion equation according to ITU 709 standard regarding gradations recordable by an electronic camera with respect to an object having a reflectance R:

$$Dv = Dmax \cdot (1.099 \cdot R^\gamma - 0.099) \quad (4)$$

where Dmax is a maximal gradation value (e.g., 255 in 8-bit data). When a reflectance R at a target point is calculated based on photometric values at respective measurement points on the object, the digital count value Dv corresponding to the photometric value at the target point can be obtained according to Equation (4). In this embodiment, a gradation conversion equation according to ITU 709 standard is used. Alternatively, a gradation conversion equation for converting a photometric value at a measurement point to a gradation value with use of a reflectance R may be obtainable by revising Equation (4).

It is not easy to directly obtain a reflectance R at each measurement point on an object. It should be noted, however, that a conventional photometer is generally designed to calibrate an exposure value based on outputs from a sensor sensing reflected light by utilizing the idea that an object having a specific reflectance $R_0$, e.g., $R_0=18\%$, is recorded at a density in an intermediate portion of a characteristic curve of a film, i.e., recorded at a medium density. Accordingly, when exposure values measured at two points on an object are respectively set as Ev1, Ev2 (Ev2>Ev1), a user can grasp a ratio of relative light intensity at the one point to the other point or a contrast B ($=2\pm\Delta^{Ev}$) based on an exposure difference $\Delta Ev=Ev2-Ev1$. Once the reflectance at the one point is determined based on the exposure difference $\Delta Ev$, the reflectance at the other point is determined based on the determined reflectance at the one point.

Further, let it be assumed that actual photographic control is performed based on an exposure value Ev1. Since a reflectance R1 at the measurement point of Ev1 corresponds to the reference reflectance $R_0$ for calibration as long as exposure control is concerned, a user can specify the reflectance R1 at the measurement point where the exposure value Ev1 has been obtained as the calibration reference reflectance $R_0$. Then, a reflectance R2 at another measurement point can be calculated according to Equation (5) by using the calibration reference reflectance $R_0$ and the contrast B.

$$R2 = R_0 \cdot B = R_0 \cdot 2\pm\Delta^{Ev} \quad (5)$$

Substituting Equation (5) in Equation (4) obtains the following conversion equation with respect to the gradation value Dv:

$$Dv = Dmax \cdot (1.099 \cdot (R_0 \cdot 2\pm\Delta^{Ev})^\gamma - 0.099) \quad (6)$$

By determining the maximal gradation value Dmax equivalent to the number of gradations, the calibration reference reflectance $R_0$, and the gamma value, then, the gradation value Dv is calculated based on the exposure difference $\Delta Ev$ according to Equation (6). For instance, in Dmax=255 (in case of 8-bit data), $\gamma=0.45$, and $R_0=18\%$, a digital count value Dvr is $Dvr=255 \cdot (1.099 \cdot 0.18^{0.45} - 0.099) \doteq 104$ because an exposure difference at a measurement point is $\Delta Ev=0$ if the exposure value at the measurement point is determined as the reference exposure value Evr. In the case where an exposure difference $\Delta Ev$ between an exposure value at a measurement point and the reference exposure value Evr is $\Delta Ev=+2$, a digital count value Dvi is $Dvi=255 \cdot (1.099 \cdot 0.18 \cdot (2^2)^{0.45} - 0.099) \doteq 216$.

Equation (6) is a conversion formula for converting an exposure difference $\Delta Ev$ to a gradation value Dv, and a function of a gamma characteristic showing a relationship between an input level to a photoelectric converting element and an output level to a recording medium. A reference gradation value lookup table can be generated by the computation according to Equation (6).

FIG. 14 is a graph showing an exemplary gamma characteristic generated by the computation according to Equation (6). Table 1 is a gradation value lookup table regarding the gamma characteristic shown in FIG. 14. As gradation value lookup table data, Table 1 are stored with exposure values $\Delta Ev$ and corresponding gradation values Dv as a result of conversion when gamma values (0.42, 0.45, 0.48) are used as parameters, respectively. The recordable range and the reflectance R are indicated for reference.

TABLE 1

| Recordable Range | Exposure Difference ($\Delta Ev$) | Reflectance R (%) | Gradation value D v | | |
|---|---|---|---|---|---|
| | | | $\gamma = 0.42$ | $\gamma = 0.45$ | $\gamma = 0.48$ |
| white | 2.6 | 109 | 253 | 266 | 281 |
| | 2.5 | 102 | 245 | 257 | 271 |
| | 2.4 | 95 | 237 | 249 | 261 |
| highlight | 2.3 | 89 | 230 | 240 | 252 |
| | 2.2 | 83 | 222 | 232 | 243 |
| | 2 | 72 | 208 | 216 | 225 |
| | 1.8 | 63 | 195 | 202 | 209 |
| | 1.6 | 55 | 183 | 188 | 194 |
| | 1.4 | 48 | 171 | 175 | 180 |
| | 1.2 | 41 | 160 | 163 | 167 |
| | 1 | 36 | 149 | 152 | 154 |
| | 0.8 | 31 | 139 | 141 | 143 |
| | 0.6 | 27 | 130 | 131 | 132 |
| | 0.4 | 24 | 121 | 121 | 122 |
| | 0.2 | 21 | 113 | 113 | 112 |
| exposure reference | 0 | 18 | 105 | 104 | 103 |
| | −0.2 | 15.7 | 98 | 96 | 95 |
| | −0.4 | 13.6 | 91 | 89 | 87 |
| | −0.6 | 11.9 | 84 | 82 | 80 |
| | −0.8 | 10.3 | 78 | 76 | 73 |
| | −1 | 9.0 | 72 | 69 | 67 |
| | −1.2 | 7.8 | 67 | 64 | 61 |
| | −1.4 | 6.8 | 61 | 58 | 55 |
| | −1.6 | 5.9 | 56 | 53 | 50 |
| | −1.8 | 5.2 | 52 | 48 | 45 |
| | −2 | 4.5 | 47 | 44 | 41 |
| | −2.2 | 3.9 | 43 | 40 | 37 |
| | −2.4 | 3.4 | 39 | 36 | 33 |
| | −2.6 | 3.0 | 36 | 32 | 29 |
| shadow | −2.8 | 2.6 | 32 | 29 | 25 |
| | −3 | 2.3 | 29 | 25 | 22 |
| black | −3.2 | 2.0 | 26 | 22 | 19 |
| | −3.4 | 1.7 | 23 | 19 | 16 |
| | −3.6 | 1.5 | 20 | 17 | 13 |

As mentioned above, the gradation value lookup table shown in FIG. 14 is revisable by revising the gradation value Dv relative to the exposure difference $\Delta Ev$. As a revising technique, there are proposed an idea of changing a gamma value and an idea of changing the gradation values Dv relative to the exposure differences $\Delta Ev$ one by one. Further, it is possible to generate a new gradation value lookup table.

In the photometric apparatus 1, light is measured with respect to a plurality of locations on an object, and exposure values are calculated based on photometric values obtained by the measurements. When a user designates one of the exposure values as the reference exposure value by pressing the reference measurement setting key 62 when a target exposure value is displayed, an exposure difference $\Delta Ev$ between the reference exposure value and the exposure value at one of the other measurement points is calculated, and digital count values Dv at the respective measurement points are calculated based on the exposure differences ΔEv and the gradation value lookup table, or the gradation value conversion Equation (6).

Figure 13:
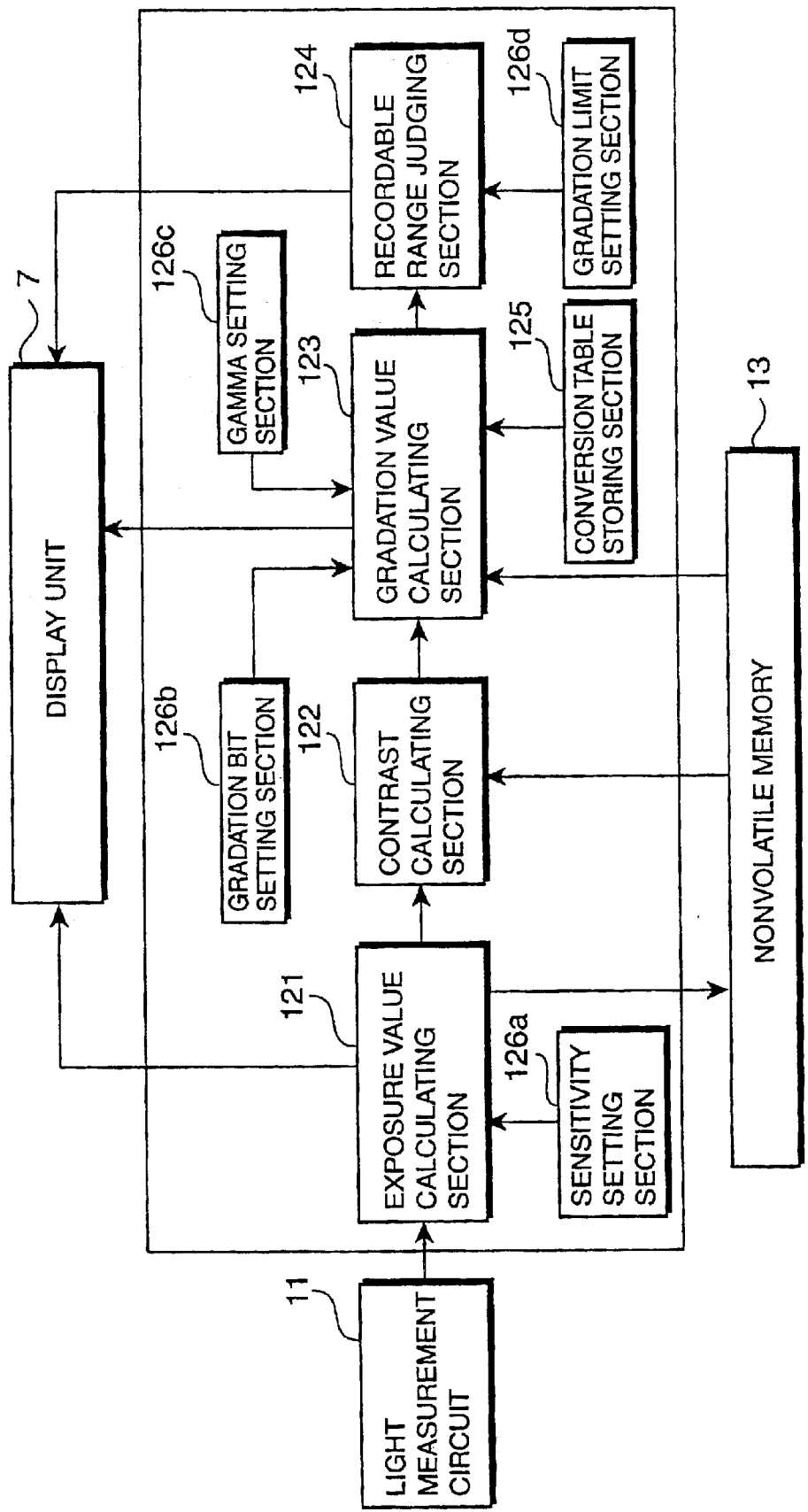
FIG. 13 is a block diagram showing how a digital count value is obtained in a controller of the photometric apparatus.

FIG. 13 is a block diagram showing how the digital count value is calculated based on light reception data from the controller 12.

As shown in FIG. 13, the controller 12 includes an exposure value calculating section 121, a contrast calculating section 122, a gradation value calculating section 123, a recordable range judging section 124, a conversion table storing section 125, a sensitivity setting section 126a, a gradation bit setting section 126b, a gamma setting section 126c, and a gradation limit setting section 126d.

The sensitivity setting section 126a sets an ISO sensitivity Sv necessary for exposure computation. The sensitivity setting section 126a inputs an ISO sensitivity Sv designated by manipulating the function selecting key 61 and the operation dial 68 of the operation unit 6 to the exposure value calculating section 121. The gradation bit setting section 126b sets a gradation bit number to determine Dmax in Equation (6). The gradation bit setting section 126b inputs a gradation bit number designated by manipulating the function selecting key 61 and the operation dial 68 of the operation unit 6 to the gradation value calculating section 123. The gamma setting section 126c sets a gamma value of the gamma characteristic, i.e., a value corresponding to γ in Equation (6). The gamma setting section 126c inputs a gamma value designated by manipulating the function selecting key 61 and the operation dial 68 of the operation unit 6 to the gradation value calculating section 123. The gradation limit setting section 126d sets a gradation limit value K (upper limit K1 and lower limit K2 or either one of these value K1, K2), a threshold value for judgment as to whether a calculated digital count value is beyond a predetermined allowable range so as to alert when the calculated digital count value is beyond the allowable range. The gradation limit setting section 126d inputs a gradation limit value K designated by manipulating the function selecting key 61 and the operation dial 68 of the operation unit 6 to the recordable range judging section 124.

The exposure value calculating section 121 calculates an exposure value Ev based on light reception data Iv or Bv that has been output from the light measurement circuit 11. The exposure value calculating section 121 calculates an exposure value Ev based on the light reception data Iv or Bv and the ISO sensitivity Sv designated in the sensitivity setting section 126a according to Equation (1) or (2) and to calculate an exposure period Time and f-number based on the thus calculated exposure value Ev according to Equation (3). Upon receiving a command from the operation unit 6 to designate the calculated exposure value Ev as a reference exposure value, the exposure value calculating section 121 outputs the calculated exposure value Ev as a reference exposure value Evr for storage in the nonvolatile memory 13. The calculated exposure value or certain exposure value Ev, the reference exposure value Evr, the exposure period Time, the f-number are output to the display unit 7 for display as shown in FIG. 5.

The contrast calculating section 122 calculates an exposure difference ΔEv. The contrast calculating section 122 reads out the reference exposure value Evr stored in the nonvolatile memory 13 for calculating an exposure difference ΔEv between the reference exposure value Evr and a certain exposure value, namely, ΔEv=Ev−Evr. In the case where the calculated exposure value Ev is stored as the reference exposure value Evr, the exposure difference ΔEv=Evr−Evr=0.

The gradation value calculating section 123 calculates a digital count value Dv based on the exposure difference Ev and the gradation value conversion table stored in the conversion table storing section 125. The conversion table storing section 125 stores the gradation value lookup table as shown in Table 1. The gradation value calculating section 123 calculates a digital count value Dv by using the conversion table stored in the conversion table storing section 125 based on the gamma value designated at the gamma setting section 126c and the maximal gradation value Dmax obtained by implementing the computation $2^n-1$ where n is the bit number designated at the gradation bit setting section 126b. The calculated digital count value Dv is output to the nonvolatile memory 13 for storage, and is also output to the display unit 7 for display as shown in FIG. 5. In the embodiment, the exposure difference ΔEv is converted to a digital count value Dv by using the gradation value lookup table. Alternatively, the exposure difference ΔEv is obtainable by implementing Equation (6).

The recordable range judging section 124 determines whether the digital count value Dv calculated by the gradation value calculating section 123 is over or less the gradation limit value K. The recordable range judging section 124 compares the digital count value Dv with the gradation limit value K set at the gradation limit setting section 126d, and judges that the digital count value Dv is outside the recordable range when Dv is beyond the gradation limit value K. The judgment result is output to the display unit 7, which in turn displays a warning as shown in FIG. 5 when the judgment result shows that the digital count value Dv is outside the recordable range.

Next, exemplary measurement operations of the controller 12 are described with reference to the flowchart shown in FIG. 15. It should be appreciated that the ISO sensitivity Sv, the gradation bit number n, the gamma value γ, and the gradation limit value K are designated before start of measurement.

When the reflected light measurement key 66 or the incident light measurement key 67 is manipulated, the sensor switchover circuit 111 is switched to control the incident light sensor 33 or the reflected light sensor 48 depending on which key 66 (67) has been manipulated so as to convert a light reception signal sensed by the sensor 33 (or 48) to light reception data of n-bit in the A/D converting circuit 112 for input (Step #1). Next, an exposure value Ev is calculated based on the light reception data and the ISO sensitivity, and f-number is calculated based on the exposure value Ev and the set shutter speed (Step #3). Results of calculations are displayed on the display unit 7 (Step #5).

Then, it is judged whether the calculated exposure value Ev is set as a reference exposure value Evr (Step #7). If the calculated exposure value Ev is set as the reference exposure value Evr (YES in Step #7), the exposure value Ev is stored as the reference exposure Evr in the nonvolatile memory 13 (Step #11), and the operation goes to Step #13. If the exposure value Ev is not set as the reference exposure value Evr, namely, the exposure value Ev is set as the certain exposure value Ev, (NO in Step #7), it is judged whether a reference exposure value Evr is stored in the nonvolatile memory 13 (Step #9). If it is judged that there is no reference exposure value Evr stored in the nonvolatile memory 13 (NO in Step #9), the computation is terminated at this step because a digital count value Dv cannot be obtained based on these values.

If it is judged that a reference exposure value Evr is stored in the nonvolatile memory 13 (YES in Step #9), the reference exposure value Evr is read out from the nonvolatile memory 13, and calculated is an exposure difference ΔEv between the read-out reference exposure value Evr and the certain calculated exposure value Ev (Step #13). Then, the reference exposure value Evr and the certain exposure value Ev are displayed on the display unit 7 (Step #15).

Subsequently, it is judged whether there exists a gradation value lookup table generated according to Equation (6) or a gradation value lookup table optionally created by a user in the conversion table storing section 125 (Step #17). If it is judged that a gradation value lookup table exists in the conversion table storing section 125 (YES in Step #17), the exposure difference ΔEv is converted to a digital count value Dv using the gradation value lookup table stored in the conversion table storing section 125 (Step #19). The converted digital count value is displayed on the display unit 7 (Step #23). If it is judged that there is no gradation value lookup table in the conversion table storing section 125 (NO in Step #17), the exposure value ΔEv is converted to a digital count value Dv by implementing the computation according to Equation (6) (Step #21), and the digital count value Dv is displayed on the display unit 7 (Step #23).

Subsequently, it is judged whether the calculated digital count value Dv is outside the recordable range by comparing the calculated digital count value Dv with the gradation limit value K (Step #25). If it is judged that the digital count value Dv does not exceed the gradation limit value K (NO in Step #25), the measurement is terminated at this step. If it is judged that the digital count value Dv is over or less the gradation limit value K (YES in Step #25), a warning that the digital count value is beyond the allowable range is displayed on the display unit 7 by turning on of the indication "0" (Step #27) before termination of the measurement. It should be appreciated that an alert sound may be output as means for warning.

Figure 15:
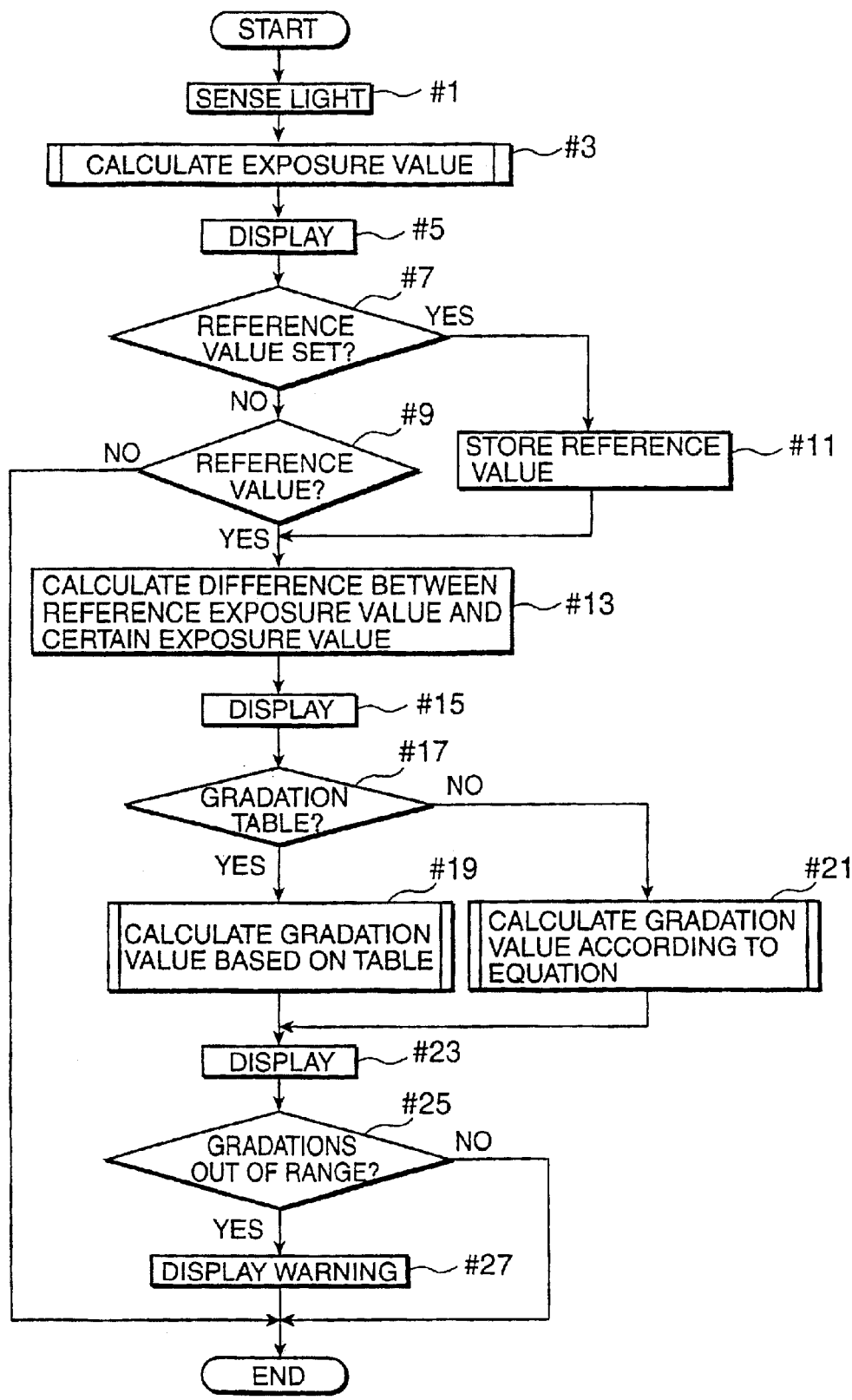
FIG. 15 is a flowchart showing measurement operations in the controller.

The measurement operation shown in FIG. 15 is performed in such a manner that a user manipulates the reflected light measurement key 66 or the incident light measurement key 67 while shifting measurement points one from another within a field of view for photographing. In other words, measurement is performed each time a measurement point is determined. With this arrangement, the user is promptly notified whether the digital count value is beyond the allowable range as well as being notified of the digital count value at the measurement point each time the measurement is performed.

The measurement operation shown in FIG. 15 describes a case that a gradation value lookup table is prepared in advance by implementing the computation according to Equation (6). Alternatively, the gradation value lookup table may partially be revised during measurement to allow a user to verify how the calculated digital count value Dv will be changed according to the revised gradation value lookup table.

In the measurement operation shown in FIG. 15, the digital count value Dv is calculated on real-time basis as measurement is carried on. Alternatively, it may be possible for a user to complete measurement of exposure values at all the measurement points, designate a desired exposure value Ev among the measured values as a reference exposure value Evr, and calculate digital count values Dv at all the measurement points for one time. This is possible because exposure values Ev at all the measurement points are storable in the nonvolatile memory 13. With this alteration, an exposure control value is settable for obtaining a record image having an optimal density distribution without an additional measurement.

As mentioned above, in the photometric apparatus 1, one of exposure values respectively measured at plural measurement points is designated as a reference exposure value Evr for calibration reference and a digital count value Dv is calculated based on an exposure difference ΔEv between the reference exposure value Evr and one of the other exposure values Ev for display on the display unit 7. With this arrangement, a user can be notified of at which gradation value the object is recorded in a recording medium with respect to the measurement points, namely, directly notified of an output value with respect to a photographic image, and accurately evaluate photographic conditions concerning the object, particularly, luminance balance, in terms of a record image.

The photometric apparatus according to the foregoing embodiment is designed solely to evaluate brightness of an object, and particularly, for use in monochromatic photographing. However, this invention is applicable to a photometric apparatus for use in color photographing. In the case of color photographing, an object light image is separated into color components of Red (R), Green (G), and Blue (B), and light reception data is generated with respect to each of the color components one by one for recording in a recording medium. Accordingly, it is necessary to calculate digital count values with respect to each of the color components one by one for display on a display unit.

As mentioned above, in color photographing, a photographic image is recorded after separating an object light image according to color components. In the case of specifying an exposure control value in color photographing with use of a photometric apparatus, a design matter that has not been expected in monochromatic photographing, such as a decision as to which color component of an exposure control value is to be used, should be considered. The aforementioned calculating method for obtaining a digital count value is also applicable to a case of obtaining a digital count value with respect to each of the color components by using a photometric apparatus in color photographing except the above point. Accordingly, a photometric apparatus for use in color photographing will be described in details concerning parts and operations relating to color separation that are differentiated from the foregoing embodiment or peculiar to the following embodiment, and the calculation of digital count values will be briefly described. It should be noted that elements in the following embodiment that are identical to those in the foregoing embodiment are denoted at the same reference numerals. Further, in the following section, described is a photometric apparatus for measuring light after separating the light into three primary color components of Red, (R), Green (G), and Blue (B).

The photometric apparatus according to this embodiment has an external construction basically identical to that of the photometric apparatus shown in FIGS. 1 to 3. In the photometric apparatus for use in color photographing, an image signal is separated into color components of R, G, B for output. In view of this, a light sensing portion 3 and a light measurement portion 4 are each provided with three light sensors having sensitivities to wavelength ranges of R, G, B, respectively. Alternatively, three light sensors having sensitivities to color components of R, G, B may be provided by adhering color filters of R, G, B on sensing planes thereof, respectively. As a further altered form, an optical system for separating light into different color components may be provided between the light sensing portion 3 (light measurement portion 4) and an object so as to arrange light sensors having relative identical light sensing characteristic on light emitting planes of the optical system for emitting color components of R, G, B, respectively.

Although the display format on a display unit 7 in this embodiment is basically identical to the one as shown in FIG. 5, the display format in this embodiment is different from that in the foregoing embodiment in that digital count values Dvr, Dvg, Dvb with respect to color components R, G, B are displayed in the section of digital count value Dv, as shown in FIG. 16. It should be appreciated that subscripts r, g, b attached to the respective numerical values in the section "Dv" represent color components red, green, blue, respectively.

Basically, the ISO sensitivity, the gamma value, and the gradation value lookup table are determined with respect to each color component in this embodiment. However, a manner of determining these measurement conditions with respect to each color component is substantially the same as mentioned in the foregoing embodiment.

Figure 17:
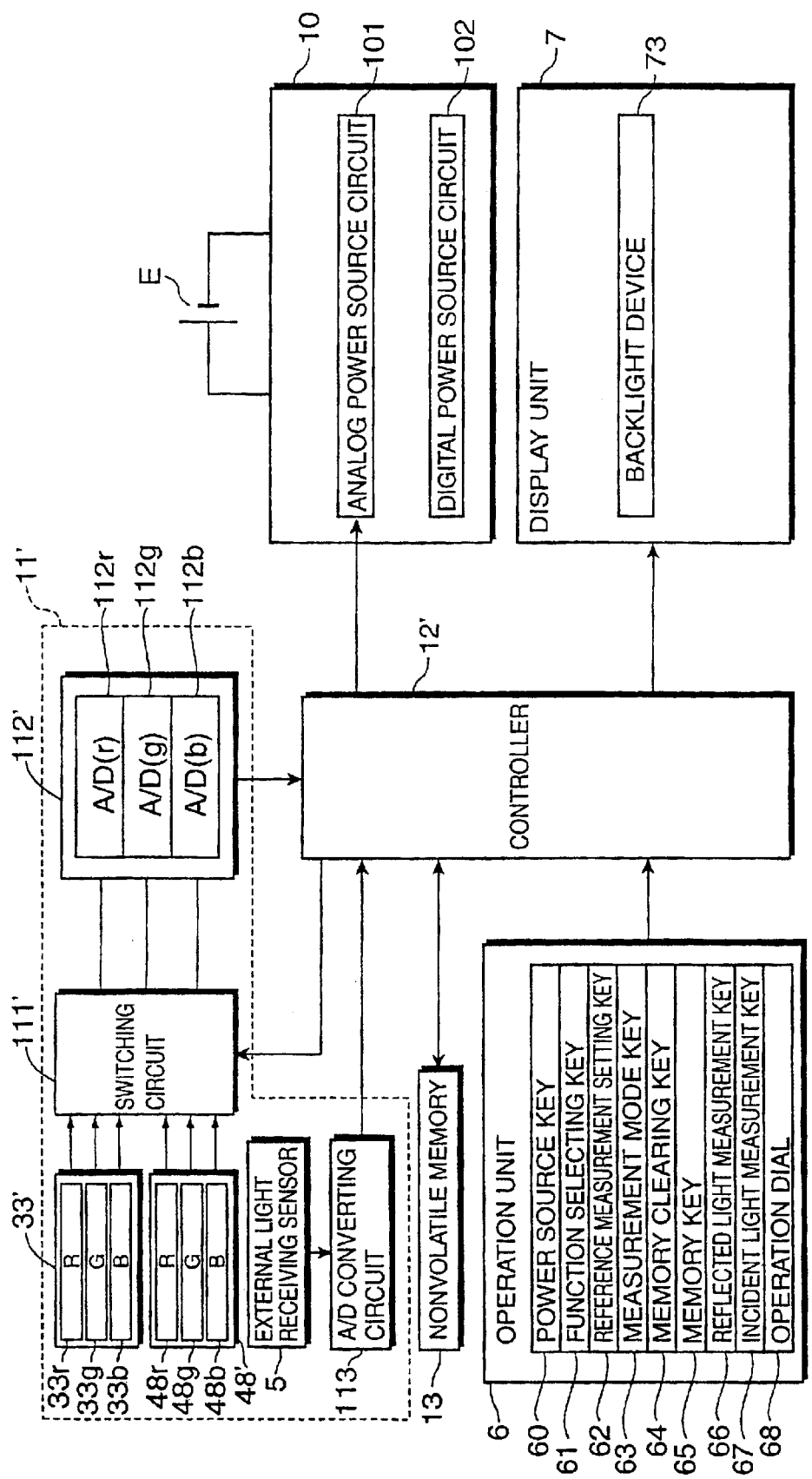
FIG. 17 is a block diagram showing an electrical configuration of the photometric apparatus for color photography.

FIG. 17 is a block diagram showing an electrical configuration of the photometric apparatus for use in color photographing. The block diagram shown in FIG. 17 is a modified block diagram in FIG. 12 in the aspect that the light measurement circuit 11 in FIG. 12 is replaced with a three-color light measurement circuit 11' in FIG. 17. The light measurement circuit 11' includes an incident light sensor unit 33' and a reflected light sensor unit 48'. The incident light sensor unit 33' has sensors 33r, 33g, 33b for sensing color components of R, G, B, respectively. The reflected light sensor unit 48' has sensors 48r, 48g, 48b for sensing the color components R, G, B, respectively. The sensor units, 33', 48' each output light reception signals of the color components R, G, B in parallel. In other words, similar to the foregoing embodiment, a sensor switchover circuit 111' switches over output of a set of light reception signals to an A/D converting circuit 112' from the sensor unit 33' or 48'.

The A/D converting circuit 112' has three A/D converters 112r, 112g, 112b in correspondence to light reception signals of the color components R, G, B. In this arrangement, a set of light reception signals of the color components R, G, B that has been output from the incident light sensor unit 33' (or the reflected light sensor unit 48') is converted to a certain bit number of light reception data in the A/D converting circuit 112' for output in a set to a controller 12'.

Figure 18:
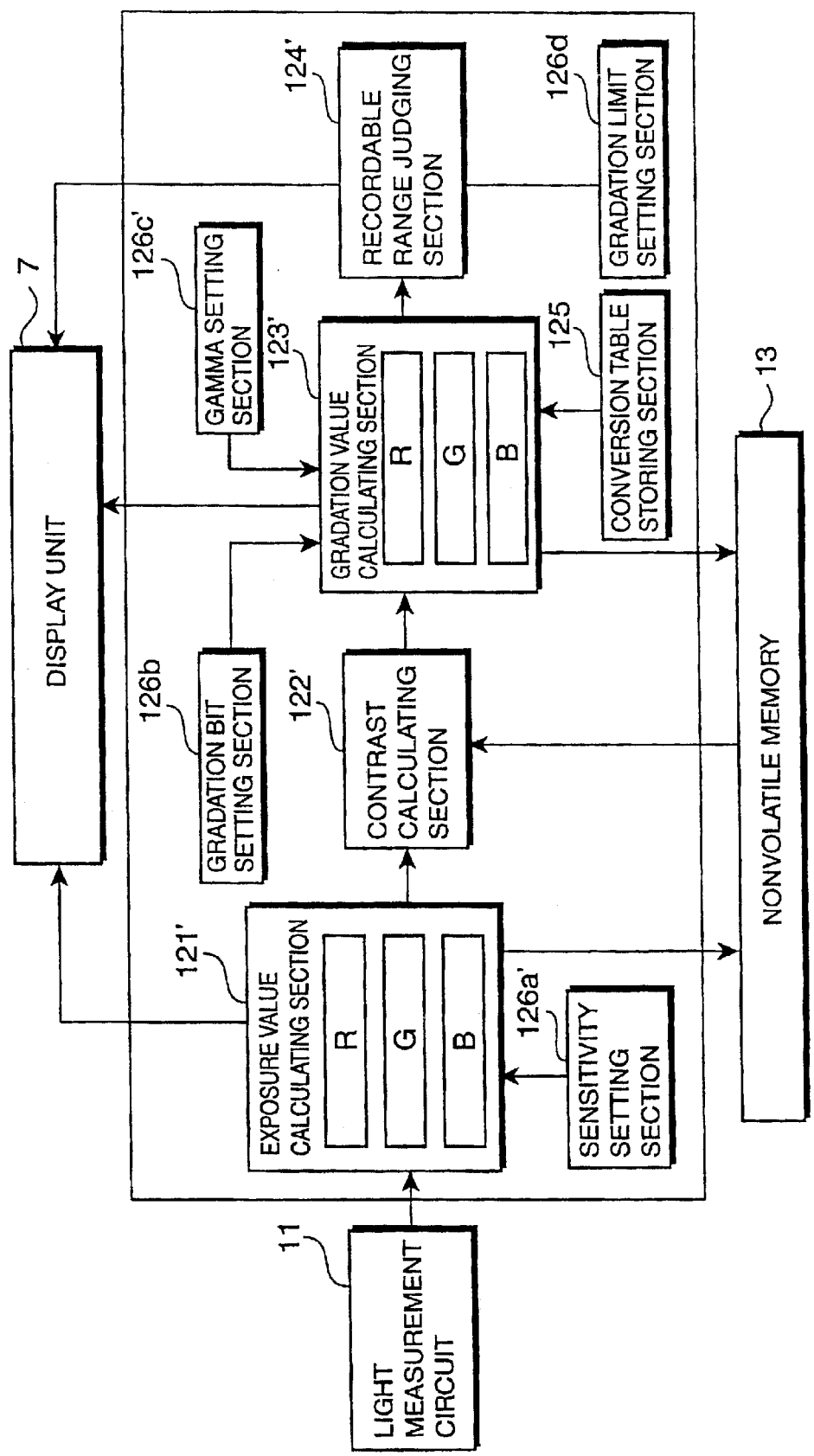
FIG. 18 is a block diagram showing how a digital count value is obtained in a controller of the photometric apparatus for color photography.

FIG. 18 is a block diagram showing how a digital count value is obtained in the controller 12' of the photometric apparatus. The block diagram shown in FIG. 18 is basically identical to the block diagram shown in FIG. 13 except that, in FIG. 18, an exposure value calculating section 121', a contrast calculating section 122', a gradation value calculating section 123', and a recordable range judging section 124' each have calculating devices and judging device in correspondence to the color components R, G, B, and that a sensitivity setting section 126a' and a gamma value setting section 126c' respectively set ISO sensitivities and gamma values in correspondence to the color components R, G, B.

The exposure value calculating section 121' has a function of obtaining an exposure value Evh or harmonic mean value that has been obtained by implementing harmonic averaging of light reception data Dr, Dg, Db of the color components R, G, B, namely, Evh $(=[(Dr^m+Dg^m+Db^m)/3]^{1/m}$. In the photometric apparatus for use in monochromatic photographing, a particular exposure value among exposure values at plural measurement points is designated as a reference exposure value. In the photometric apparatus for use in color photographing, however, it is necessary to designate a reference exposure value among three exposure values corresponding to the color components R, G, B, in addition to designating an exposure value among exposure values at plural measurement points as a reference exposure value. In view of this, in this embodiment, a harmonic mean value Evh is calculated based on exposure values Evr, Evg, Evb of the color components R, G, B at each measurement point to designate the resultant harmonic mean value Evh as a reference exposure value.

Figure 20A:
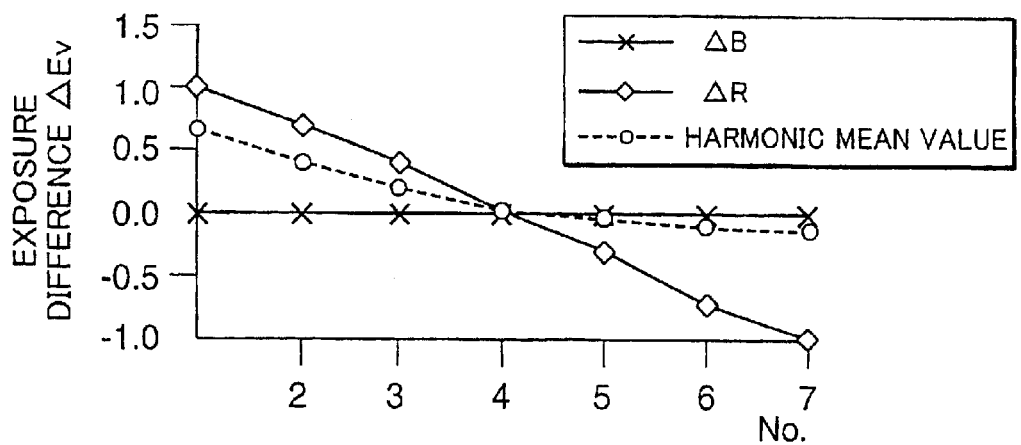
FIGS. 20A to 20C are graphs showing exemplary characteristics of a harmonic mean exposure value respectively.
Figure 20B:
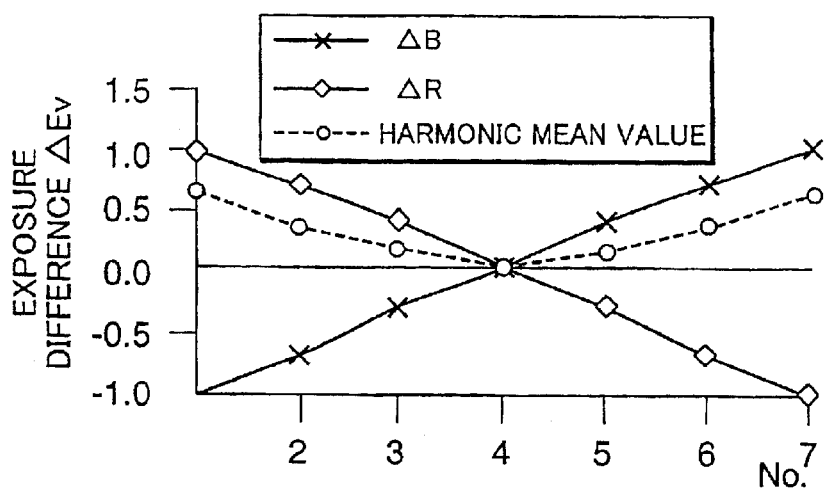
Figure 20C:
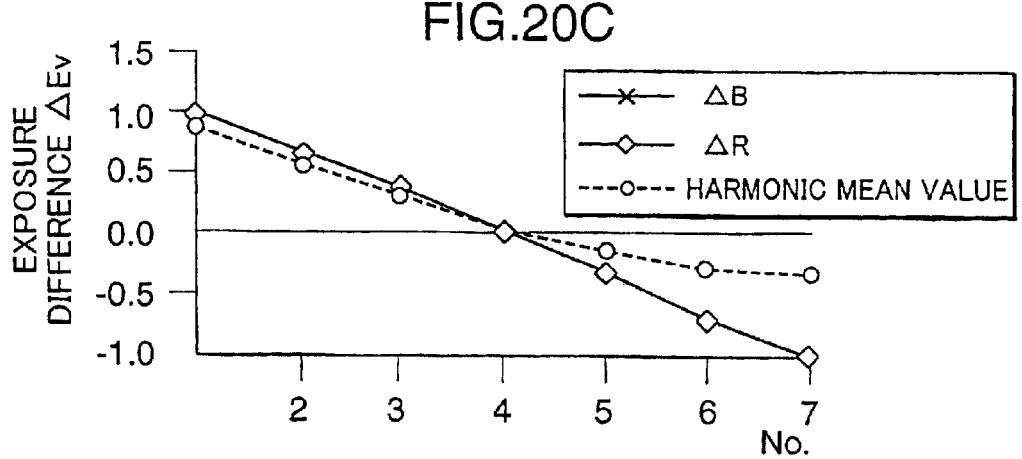

The method for designating a reference exposure value is not limited to the above method of using a harmonic mean value Evh. For instance, it may be possible to designate a maximal value among exposure values Evr, Evg, Evb of the color components R, G, B as a reference exposure value. The method of utilizing the maximal value is advantageous in that none of the three colors is likely to be saturated in the vicinity of the maximal value in a recordable range or in that a color balance is less likely to be lost. On the other hand, the method of utilizing the harmonic mean value is advantageous in the following point. As shown in the graphs of FIGS. 20A to 20C respectively showing characteristics of the harmonic mean value, the harmonic mean value Evh always lies between the maximal value and the minimal value of an exposure difference $\Delta R$ (=Evr−Evg) and $\Delta B$(= Evb−Evg) which are exposure difference between two of the three color components. This is advantageous in providing harmony or balance with respect to the three colors. At any rate, it is a user's option to determine which exposure value is designated as a reference exposure value depending on a priority factor among a variety of factors that may affect quality of color image.

FIGS. 20A, 20B, 20C are graphs corresponding to the following Tables 2, 3, and 4, respectively. In tables 2 to 4, the harmonic mean value Evh $(=[(Dr^4+Dg^4+Db^4)/3]^{1/4}$ where m=4.

TABLE 2

| | Ratio in each color when G = 1 | | | exposure difference relative to G | | |
|---|---|---|---|---|---|---|
| No. | B | G | R | ΔE v b | ΔE v r | harmonic mean value |
| 1 | 1 | 1 | 2 | 0.0 | 1.0 | 0.65 |
| 2 | 1 | 1 | 1.6 | 0.0 | 0.7 | 0.38 |
| 3 | 1 | 1 | 1.3 | 0.0 | 0.4 | 0.17 |
| 4 | 1 | 1 | 1 | 0.0 | 0.0 | 0.00 |
| 5 | 1 | 1 | 0.8 | 0.0 | −0.3 | −0.08 |
| 6 | 1 | 1 | 0.6 | 0.0 | −0.7 | −0.12 |
| 7 | 1 | 1 | 0.5 | 0.0 | −1.0 | −0.14 |

TABLE 3

| | ratio in each color when G = 1 | | | exposure difference relative to G | | |
|---|---|---|---|---|---|---|
| No. | B | G | R | ΔE v b | ΔE v r | harmonic mean value |
| 1 | 0.5 | 1 | 2 | −1.0 | 1.0 | 0.63 |
| 2 | 0.6 | 1 | 1.6 | −0.7 | 0.7 | 0.34 |
| 3 | 0.8 | 1 | 1.3 | −0.3 | 0.4 | 0.13 |
| 4 | 1 | 1 | 1 | 0.0 | 0.0 | 0.00 |
| 5 | 1.3 | 1 | 0.8 | 0.4 | −0.3 | 0.13 |
| 6 | 1.6 | 1 | 0.6 | 0.7 | −0.7 | 0.34 |
| 7 | 2 | 1 | 0.5 | 1.0 | −1.0 | 0.63 |

TABLE 4

| | ratio in each color when G = 1 | | | exposure difference relative to G | | harmonic mean value |
|---|---|---|---|---|---|---|
| No. | B | G | R | ΔE v b | ΔE v r | |
| 1 | 2   | 1 | 2   | 1.0  | 1.0  | 0.86  |
| 2 | 1.6 | 1 | 1.6 | 0.7  | 0.7  | 0.56  |
| 3 | 1.3 | 1 | 1.3 | 0.4  | 0.4  | 0.29  |
| 4 | 1   | 1 | 1   | 0.0  | 0.0  | 0.00  |
| 5 | 0.8 | 1 | 0.8 | −0.3 | −0.3 | −0.18 |
| 6 | 0.6 | 1 | 0.6 | −0.7 | −0.7 | −0.31 |
| 7 | 0.5 | 1 | 0.5 | −1.0 | −1.0 | −0.35 |

Figure 19:
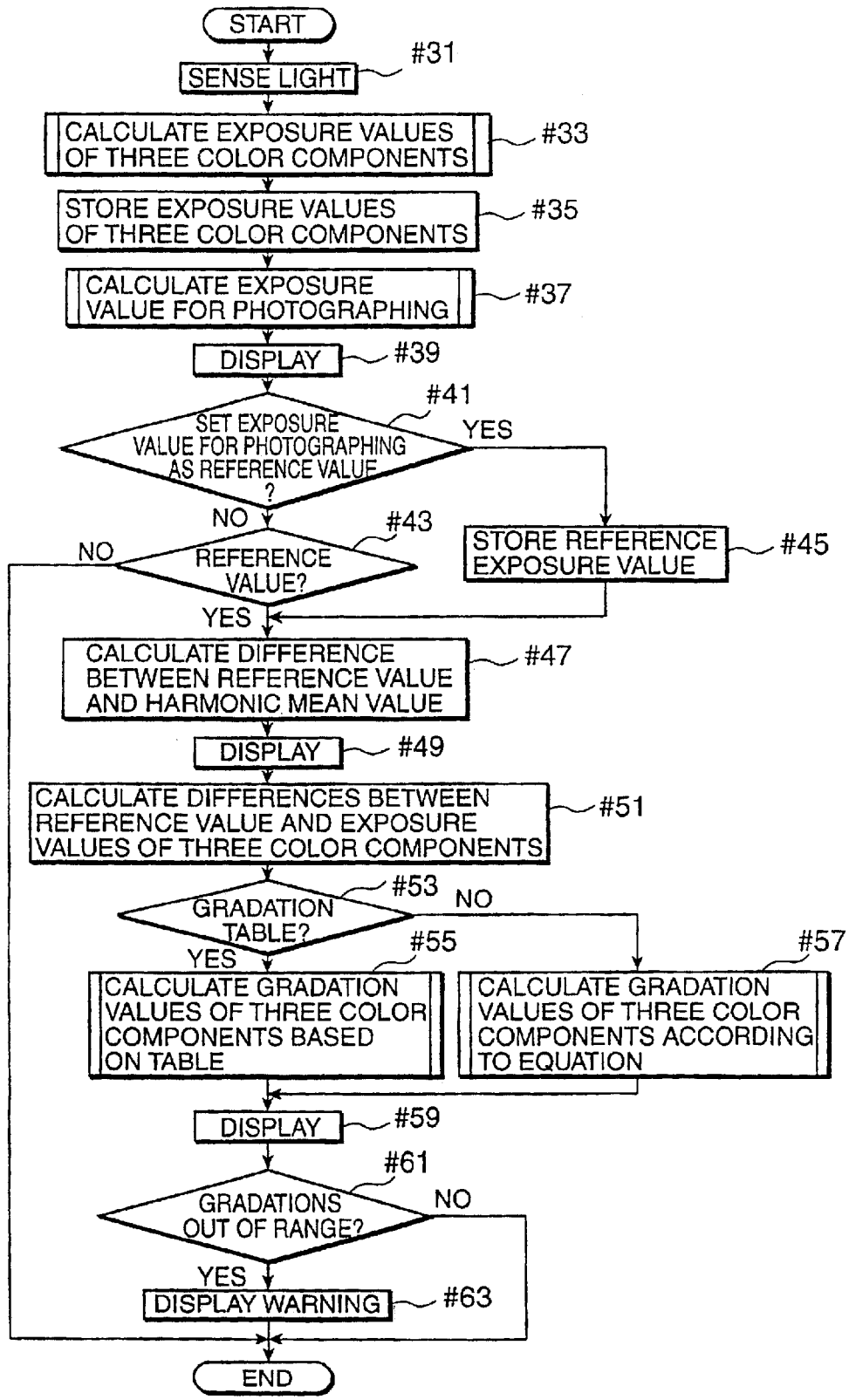
FIG. 19 is a flowchart showing measurement operations in the controller of the photometric apparatus for color photography.

Next, an exemplary measurement operation in the controller 12' is described with reference to the flowchart shown in FIG. 19. It should be appreciated that the ISO sensitivity Sv, the gamma value γ, the gradation bit number n, and the gradation limit value K with respect to the color components R, G, B, all of which are necessary for computation, are designated before start of measurement.

When a reflected light measurement key 66 or the incident light measurement key 67 is manipulated, the sensor switchover circuit 111' is switched to control the incident light sensor unit 33' or the reflected light sensor unit 48' depending on which key 66 (67) has been manipulated so as to convert light reception signals Sr, Sg, Sb of the color components R, G, B output from the sensor unit 33' (or 48') to light reception data Dr, Dg, Db each in n-bit at the A/D converting circuit 112' for input (Step #31). Next, exposure values Evr, Evg, Evb of the color components R, G, B are calculated based on the light reception data Dr, Dg, Db and the ISO sensitivities in correspondence thereto (Step #33), and the calculation results are stored in a nonvolatile memory 13 (Step #35). Further, a harmonic mean value Evh is calculated based on the light reception data Dr, Dg, Db of the color components R, G, B (Step #37) for display on the display unit 7 (Step #39). It should be noted that m in the equation $Evh=[(Dr^m+Dg^m+Db^m)/3]^{1/m}$ is an empirically set value.

Then, it is judged whether the obtained harmonic mean value Evh is designated as a reference exposure value Evo (Step #41). If the harmonic mean value Evh is designated as the reference exposure value Evo (YES in Step #41), the exposure value Evh is stored as the reference exposure value Evo in the nonvolatile memory 13 (Step #45), and the operation goes to Step #47. If the exposure value Evh is not designated as the reference exposure value Evo (NO in Step #41), it is judged whether a reference exposure value Evo is stored in the nonvolatile memory 13 (Step #43). If it is judged that there is no reference exposure value Evo stored in the nonvolatile memory 13 (NO in Step #43), the computation is terminated at this step because a digital count value Dv cannot be obtained based on these values.

If it is judged that a reference exposure value Evo is stored in the nonvolatile memory 13 (YES in Step #43), the reference exposure value Evo is read out from the nonvolatile memory 13, and calculated is an exposure difference ΔEv between the read-out reference exposure value Evo and the calculated harmonic mean value Evh (Step #47). Next, the reference exposure value Evo and the harmonic mean value Evh are displayed on the display unit 7 (Step #49) (see a bar-like display segment 71b in FIG. 16). Subsequently, calculated are exposure differences ΔEvr (=Evr−Evo), ΔEvg (=Evg−Evo), ΔEvb (=Evb−Evo) between the reference exposure value Evo and the exposure values Evr, Evg, Evb with respect to the color components R, G, B (Step #51).

This Subsequently, it is judged whether there exists a gradation value lookup table generated according to Equation (6) or a gradation value lookup table optionally created by a user in a conversion table storing section 125 (Step #53). If it is judged that a gradation value lookup table exists in the conversion table storing section 125 (YES in Step #53), the exposure differences ΔEvr, ΔEvg, ΔEvb are converted to digital count values Dvr, Dvg, Dvb, respectively using the gradation value lookup table stored in the conversion table storing section 125 (Step #55). The converted digital count values are displayed on the display unit 7 (Step #59, see FIG. 16). If it is judged that there is no gradation value lookup table in the conversion table storing section 125 (NO in Step #53), the exposure values ΔEvr, ΔEvg, ΔEvb are converted to digital count values Dvr, Dvg, Dvb by implementing the computation according to Equation (6) (Step #57), and the digital count values Dvr, Dvg, Dvb are displayed on the display unit 7 (Step #59, see FIG. 16).

Subsequently, it is judged whether the calculated digital count value Dvr, (or Dvg or Dvb) is outside the recordable range by comparing the digital count value with the gradation limit value K (Step #61). If it is judged that at least one of the digital count values Dvr, Dvg, Dvb does not exceed the gradation limit value K (NO in Step #61), the measurement is terminated at this step. If it is judged that all the digital count values Dvr, Dvg, Dvb exceed the gradation limit value K (YES in Step #61), a warning that the digital count values are out of the allowable range is displayed on the display unit 7 by turning on of the indication "0" (Step #63) before termination of the measurement.

In this embodiment, described is a case where light is sensed with respect to color components of R, G, B. Spectral color components are not limited to these three primary color components. Alternatively, spectral color components may be three primary color components C, M, Y according to complementary color system. Further, the number of spectral color components may be determined in correspondence with a spectral sensitivity of a sensor in a camera.

In the foregoing embodiments, described is the photometric apparatus incorporated with the light sensing portion capable of sensing incident light and reflected light to measure incident light or reflected light by switching over the circuit. Alternatively, a photometric apparatus may be incorporated with a light sensing portion capable of sensing incident light solely or a light sensing portion capable of sensing reflected light solely.

As described above, a photometric apparatus comprises: a photo sensor which senses light to output light data in accordance with an intensity of the sensed light; a first receiver which allows photosensitivity data to be inputted; an exposure value calculator which calculates an exposure value based on light data from the photo sensor and the inputted photosensitivity; a second receiver which allows a particular calculated exposure value to be designated as a reference exposure value for an actual photographing; an exposure value difference calculator which calculates a difference between a calculated exposure value and the reference exposure value; a gamma characteristic provider which provides a gamma characteristic concerning a relationship between the exposure value difference and a gradation value of digital data; a gradation calculator which calculates, based on the exposure value difference and the gamma characteristic, a gradation value of digital data in connection with an object having the calculated exposure value when the object is photographed at the reference exposure value; and an indicator which indicates the calculated gradation value of digital data in connection with the object.

For recording of an image of an object at a specified location by an electronic camera, the photometric apparatus receives incident light on the object or reflected light from the object, and calculates and indicates a gradation value of the object image based on the received light. With this arrangement, the photographer can evaluate the brightness of the object image in terms of a gradation value to be used at actual image recording. The photographer can optimally adjust various photographic requirements concerning illumination, exposure, etc.

Further, in the above arrangement, an exposure value is obtained based on light data from the photo sensor, and one of exposure values at plural measurement points on the object is designated as a reference exposure value for photographing. An exposure difference between the reference exposure value and one of the other exposure values is calculated. A gradation value is calculated based on the exposure difference, and a gamma characteristic concerning a relationship between the exposure value difference and the gradation value of digital data corresponding thereto, e.g., a conversion equation for converting a exposure difference to a gradation value, or a table for directly converting a exposure value to a gradation value. Thereby, a gradation value in a record image in an electronic camera is calculated with ease by utilizing the measurement technology of the conventional photometric apparatus.

Furthermore, in the above arrangement, judged is whether a calculated gradation value lies in a predetermined allowable range, that is, it is judged whether the object image has an optimal density distribution. If a gradation value is judged to exceed the allowable range, a warning is sent to the photographer. With this arrangement, the photographer can easily and accurately be notified that the gradation value is beyond the allowable range based on a judgment result.

Also, a photometric apparatus is provided with a photo sensor which senses light from an object and separates the sensed light into at least three color components to output light data in accordance with an intensity of the light with respect to each color component; a first receiver which allows photosensitivity data with respect to each color component to be inputted; a first exposure value calculator which calculates an exposure value based on light data from the photo sensor and the photosensitivity data with respect to each color component; a second exposure value calculator which calculates an exposure control value for exposure control by using a calculated exposure value with respect to each color component; a second receiver which allows a particular calculated exposure control value to be designated as a reference exposure value for an actual photographing; an exposure value difference calculator which calculates a difference between a calculated exposure value with respect to each color component and the reference exposure value; a gamma characteristic provider which provides a gamma characteristic concerning a relationship between the exposure value difference and a gradation value of digital data with respect to each color component; a gradation calculator which calculates, based on the exposure value difference and the gamma characteristic, a gradation value of digital data in connection with an object having the calculated exposure value with respect to each color component when the object is photographed at the reference exposure value; and an indicator which indicates the calculated gradation value of digital data with respect to each color component.

For recording of a color image of an object at a specified location by an electronic camera, the photometric apparatus receives incident light on the object or reflected light from the object, and separates the light into at least three color components to obtain light data with respect to each of the color components, and calculates and indicates a gradation value of the color object image. With this arrangement, information regarding color in a record image in color photographing can be accurately provided to the photographer. The photographer can optimally adjust various photographic requirements concerning illumination, exposure, etc.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A photometric apparatus comprising:
   a photo sensor which senses light to output light data in accordance with an intensity of the sensed light;
   a first receiver which allows photosensitivity data to be inputted;
   an exposure value calculator which calculates an exposure value based on light data from the photo sensor and the inputted photosensitivity;
   a second receiver which allows a particular calculated exposure value to be designated as a reference exposure value for an actual photographing;
   an exposure value difference calculator which calculates a difference between a calculated exposure value and the reference exposure value;
   a gamma characteristic provider which provides a gamma characteristic concerning a relationship between the exposure value difference and a gradation value of digital data;
   a gradation calculator which finds, based on the exposure value difference and the gamma characteristic, a calculated gradation value of digital data in connection with an object having the calculated exposure value when the object is photographed at the reference exposure value; and
   an indicator which indicates the calculated gradation value of digital data in connection with the object.

2. The photometric apparatus according to claim 1, wherein the indicator indicates at least one of the photosensitivity, the exposure value, and the reference exposure value.

3. The photometric apparatus according to claim 1, wherein the photo sensor includes an incident light sensing device which senses incident light on the object, and a reflected light sensing device which senses a reflected light from the object, further comprising a switch device which switches over the incident light sensing device and the reflected light sensing device.

4. The photometric apparatus according to claim 1, wherein the gamma characteristic provider includes a predetermined conversion equation for converting an exposure value difference to a gradation value of digital data, the conversion equation having a gamma value as a parameter, and the gradation calculator converts an exposure value difference to the calculated gradation value according to the conversion equation.

5. The photometric apparatus according to claim 4, wherein the gamma value in the conversion equation is variable.

6. The photometric apparatus according to claim 1, wherein the gamma characteristic provider includes a predetermined conversion table for converting an exposure value difference to a gradation value of digital data, and the gradation calculator converts an exposure value difference to the calculated gradation value based on the conversion table.

7. The photometric apparatus according to claim 6, wherein the conversion table is set by entering an exposure value difference and a corresponding gradation value corresponding to the exposure value difference.

8. The photometric apparatus according to claim 1, further comprising a gradation limit provider which provides an allowable range of a gradation value, a judger which judges whether the calculated gradation value calculated by the gradation calculator lies in the allowable range, and a warning device.

9. The photometric apparatus according to claim 1, further comprising a gradation number changer which changes the gradation number of digital data.

10. A photometric apparatus comprising:
   a photo sensor which senses light and separates the sensed light into at least three color components to output light data in accordance with an intensity of the light with respect to each color component;
   a first receiver which allows photosensitivity data with respect to each color component to be inputted;
   a first exposure value calculator which calculates an exposure value based on light data from the photo sensor and the photosensitivity data with respect to each color component;
   a second exposure value calculator which calculates an exposure control value for exposure control by using a calculated exposure value with respect to each color component;
   a second receiver which allows a particular calculated exposure control value to be designated as a reference exposure value for an actual photographing;
   an exposure value difference calculator which calculates a difference between a calculated exposure value with respect to each color component and the reference exposure value;
   a gamma characteristic provider which provides a gamma characteristic concerning a relationship between the exposure value difference and a gradation value of digital data with respect to each color component;
   a gradation calculator which finds, based on the exposure value difference and the gamma characteristic, a calculated gradation value of digital data in connection with an object having the calculated exposure value with respect to each color component when the object is photographed at the reference exposure value; and
   an indicator which indicates the calculated gradation value of digital data with respect to each color component.

11. The photometric apparatus according to claim 10, wherein the exposure control value is an exposure value obtained based on a harmonic mean value of light data with respect to the color components.

12. The photometric apparatus according to claim 10, wherein the indicator indicates at least one of the photosensitivity, the exposure value, and the reference exposure value.

13. The photometric apparatus according to claim 10, wherein the photo sensor includes an incident light sensing device which senses incident light on the object, and a reflected light sensing device which senses a reflected light from the object, further comprising a switch device which switches over the incident light sensing device and the reflected light sensing device.

14. The photometric apparatus according to claim 10, wherein the gamma characteristic provider includes a predetermined conversion equation for converting an exposure value difference to a gradation value of digital data, the conversion equation having a gamma value as a parameter, and the gradation calculator converts an exposure value difference to the calculated gradation value according to the conversion equation.

15. The photometric apparatus according to claim 14, wherein the gamma value in the conversion equation is variable.

16. The photometric apparatus according to claim 10, wherein the gamma characteristic provider includes a predetermined conversion table for converting an exposure value difference to a gradation value of digital data, and the gradation calculator converts the exposure value difference to the calculated gradation value based on the conversion table.

17. The photometric apparatus according to claim 16, wherein the conversion table is set by entering an exposure value difference and a corresponding gradation value corresponding to the exposure value difference.

18. The photometric apparatus according to claim 10, further comprising a gradation limit provider which provides an allowable range of the calculated gradation value, a judger which judges whether the calculated gradation value calculated by the gradation calculator lies in the allowable range, and a warning device which warns that the calculated gradation value is out of the allowable range when the judger judges so.

19. The photometric apparatus according to claim 10, further comprising a gradation number changer which changes the gradation number of digital data.

* * * * *

UNITED STATES PATENT AND TRADEMARK OFFICE
CERTIFICATE OF CORRECTION

PATENT NO. : 6,900,886 B2
DATED : May 31, 2005
INVENTOR(S) : Yoshio Yuasa

It is certified that error appears in the above-identified patent and that said Letters Patent is hereby corrected as shown below:

Column 25,
Line 14, delete "warning device." and insert -- warning device which warns that the calculated gradation value is out of the allowable range when the judger judges so. --.

Signed and Sealed this

Twenty-third Day of August, 2005

JON W. DUDAS
*Director of the United States Patent and Trademark Office*